(12) United States Patent
Uenishi et al.

(10) Patent No.: US 9,486,740 B2
(45) Date of Patent: Nov. 8, 2016

(54) EXHAUST PURIFICATION SYSTEM OF INTERNAL COMBUSTION ENGINE

(75) Inventors: Toru Uenishi, Susono (JP); Kohei Yoshida, Gotenba (JP); Mikio Inoue, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/116,542

(22) PCT Filed: Jun. 21, 2012

(86) PCT No.: PCT/JP2012/065902
§ 371 (c)(1),
(2), (4) Date: Nov. 8, 2013

(87) PCT Pub. No.: WO2013/190687
PCT Pub. Date: Dec. 27, 2013

(65) Prior Publication Data
US 2015/0147238 A1  May 28, 2015

(51) Int. Cl.
*B01D 53/94* (2006.01)
*F01N 3/035* (2006.01)
*F01N 3/08* (2006.01)
(Continued)

(52) U.S. Cl.
CPC ........... *B01D 53/9431* (2013.01); *F01N 3/035* (2013.01); *F01N 3/0814* (2013.01); *F01N 3/0842* (2013.01); *F01N 3/0871* (2013.01); *F01N 3/0885* (2013.01); *F01N 13/0097* (2014.06); *F02D 41/028* (2013.01); *F02D 41/0275* (2013.01); *F02M 26/05* (2016.02); *F02M 26/06* (2016.02); *F02M 26/15* (2016.02); *F01N 2240/30* (2013.01); *F01N 2900/08* (2013.01); *F01N 2900/1402* (2013.01)

(58) Field of Classification Search
None
See application file for complete search history.

(56) References Cited

U.S. PATENT DOCUMENTS

| 7,469,691 | B2 | 12/2008 | Joergl et al. |
| 2010/0018187 | A1 | 1/2010 | Matsumoto et al. |
| 2010/0211293 | A1* | 8/2010 | Yamada ............... F01N 3/0253 701/108 |

(Continued)

FOREIGN PATENT DOCUMENTS

| EP | 2 642 096 A1 | 9/2013 |
| JP | 2007092683 A | 4/2007 |

(Continued)

OTHER PUBLICATIONS

Tomohiro et al. JP2008208720—machine translation, 2008.*

(Continued)

*Primary Examiner* — Walter D Griffin
*Assistant Examiner* — Jelitza Perez
(74) *Attorney, Agent, or Firm* — Oliff PLC

(57) ABSTRACT

In an engine, an exhaust purification catalyst (13) and a hydrocarbon feed valve (15) are arranged in an engine exhaust passage, and, a low pressure exhaust gas recirculation system (LPL) which makes exhaust gas downstream of the exhaust purification catalyst (13) recirculate is provided. If hydrocarbons are injected from the hydrocarbon feed valve (15), a carbon dioxide which is generated at the exhaust purification catalyst (13) is recirculated, and the air-fuel ratio of the exhaust gas which flows into the exhaust purification catalyst (13) temporarily drops. Hydrocarbons are injected from the hydrocarbon feed valve (15) in synchronization with this temporary drop in the air-fuel ratio.

8 Claims, 23 Drawing Sheets

(51) Int. Cl.
*F02D 41/02* (2006.01)
*F01N 13/00* (2010.01)

(56) References Cited

U.S. PATENT DOCUMENTS

2012/0131908 A1    5/2012  Bisaiji et al.
2012/0144806 A1*   6/2012  Hamamatsu ....... F02M 25/0707
                                                    602/278
2015/0147238 A1    5/2015  Uenishi et al.

FOREIGN PATENT DOCUMENTS

| JP | 2008208720 A * | 9/2008 |
| JP | A-2008-280952 | 11/2008 |
| JP | A-2009-257195 | 11/2009 |
| JP | 2010222972 A | 10/2010 |
| WO | WO 2008/122866 A2 | 10/2008 |
| WO | WO 2011/114499 A1 | 9/2011 |
| WO | 2013190687 A1 | 12/2013 |

OTHER PUBLICATIONS

Choi et al. Functionality of Commercial NOx Storage-Reduction Catalysts and the Development of a Representative Model. Oak Ridge National Laboratory. US Department of Energy. 2010, ppt, slides 1-27. http://energy.gov/sites/prod/files/2014/03/f8/deer10_toops1.pdf.*

May 11, 2016 Office Action issued in U.S. Appl. No. 14/429,508.

* cited by examiner

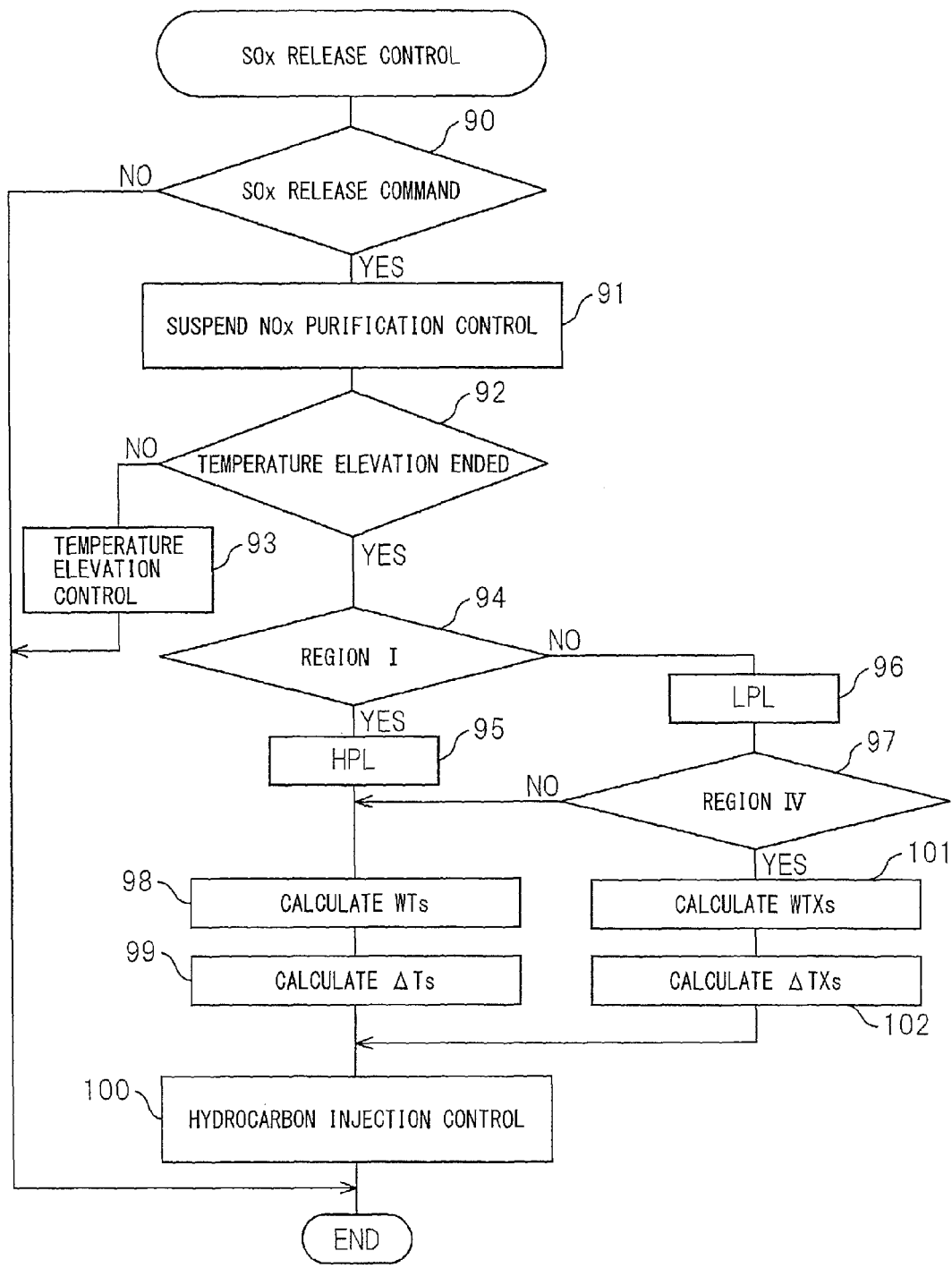

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine in which an exhaust gas recirculation system is provided for making exhaust gas which is exhausted into an engine exhaust passage recirculate to the inside of the intake passage, an exhaust purification catalyst is arranged inside of the engine exhaust passage and a hydrocarbon feed valve is arranged the engine exhaust passage upstream of the exhaust purification catalyst, a precious metal catalyst is carried on an exhaust gas flow surface of the exhaust purification catalyst and a basic exhaust gas flow surface part is formed around the precious metal catalyst, and, at the time of engine operation, hydrocarbons are injected from the hydrocarbon feed valve by a predetermined period and thereby $NO_x$ which is contained in the exhaust gas is removed (for example, see Patent Literature 1). In this internal combustion engine, a high $NO_x$ removal rate can be obtained even if the temperature of the exhaust purification catalyst becomes a high temperature.

CITATIONS LIST

Patent Literature

Patent Literature 1: WO2011/114499A1

SUMMARY OF INVENTION

Technical Problem

However, in this internal combustion engine, there is the problem that the amount of hydrocarbons that are used for removing the $NO_x$ is still too great.

An object of the present invention is to provide an exhaust purification system of an internal combustion engine which reduces the amount of consumption of hydrocarbons for removing $NO_x$ while obtaining a high $NO_x$ removal rate.

Solution to Problem

According to the present invention, there is provided an exhaust purification system of an internal combustion engine in which an exhaust purification catalyst is arranged in an engine exhaust passage and a hydrocarbon feed valve is arranged in the engine exhaust passage upstream of the exhaust purification catalyst, a precious metal catalyst is carried on an exhaust gas flow surface of the exhaust purification catalyst and a basic exhaust gas flow surface part is formed around the precious metal catalyst, the exhaust purification catalyst has a property of reducing $NO_x$ which is contained in exhaust gas if making a concentration of hydrocarbons which flow into the exhaust purification catalyst vibrate by within a predetermined range of amplitude and by within a predetermined range of period and has a property of being increased in storage amount of $NO_x$ which is contained in the exhaust gas if making the vibration period of the hydrocarbon concentration longer than the predetermined range, and, at the time of engine operation, hydrocarbons are injected from the hydrocarbon feed valve by the predetermined period whereby the $NO_x$ contained in the exhaust gas is removed, wherein a low pressure exhaust gas recirculation system which makes exhaust gas downstream of the exhaust purification catalyst in the engine exhaust passage recirculate to the inside of an intake passage is provided, carbon dioxide which is generated at the exhaust purification catalyst is recirculated if hydrocarbons are injected from the hydrocarbon feed valve when the exhaust gas recirculation action by the low pressure exhaust gas recirculation system is being performed and a temporary drop in an air-fuel ratio of an inflowing exhaust gas which flows into the exhaust purification catalyst is caused when a time which is required for recirculation of the carbon dioxide after injection of the hydrocarbons elapses, and hydrocarbons are injected from the hydrocarbon feed valve in synchronization with the temporary drop in the air-fuel ratio of the inflowing exhaust gas when injecting hydrocarbons from the hydrocarbon feed valve by the predetermined period.

Advantageous Effects of Invention

It is possible to reduce the amount of consumption of hydrocarbons for removal of $NO_x$ while obtaining a high $NO_x$ removal rate.

BRIEF DESCRIPTION OF DRAWINGS

FIG. 31 is a flow chart for $SO_X$ release control.

DESCRIPTION OF EMBODIMENTS

Figure 1:
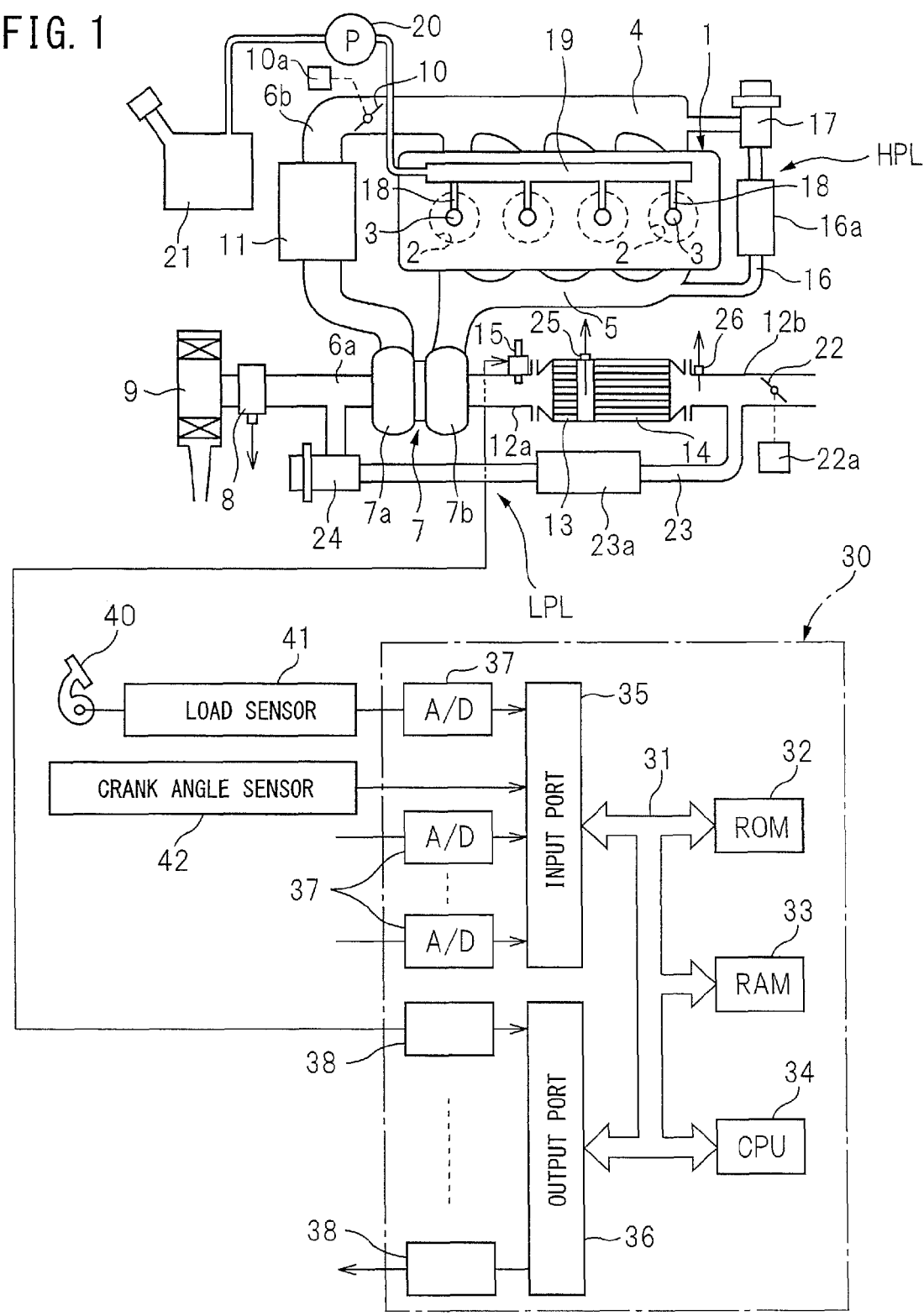
FIG. 1 is an overall view of a compression ignition type internal combustion engine.

FIG. 1 is an overall view of a compression ignition type internal combustion engine.

Referring to FIG. 1, 1 indicates an engine body, 2 a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6b to an outlet of a compressor 7a of an exhaust turbocharger 7, while an inlet of the compressor 7a is connected through an intake duct 6a and an intake air detector 8 to an air cleaner 9. Inside the intake duct 6a, a throttle valve 10 which is driven by an actuator 10a is arranged. Around the intake duct 6b, a cooling device 11 is arranged for cooling the intake air which flows through the inside of the intake duct 6b. In the embodiment which is shown in FIG. 1, the engine cooling water is guided to the inside of the cooling device 11 where the engine cooling water is used to cool the intake air.

On the other hand, the exhaust manifold 5 is connected to the inlet of an exhaust turbine 7b of the exhaust turbocharger 7, and the outlet of the exhaust turbine 7b is connected through an exhaust pipe 12a to the inlet of the exhaust purification catalyst 13. A particulate filter 14 is arranged downstream of the exhaust purification catalyst 13, and the outlet of the particulate filter 14 is connected to an exhaust pipe 12b. Upstream of the exhaust purification catalyst 13 inside the exhaust pipe 12a, a hydrocarbon feed valve 15 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 15. Note that, the present invention can also be applied to a spark ignition type internal combustion engine in which fuel is burned under a lean air-fuel ratio. In this case, from the hydrocarbon feed valve 15, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 16. An electronically controlled EGR control valve 17 is arranged in the EGR passage 16, and around the EGR passage 16, a cooling device 16a is arranged for cooling the exhaust gas which flows through the inside of the EGR passage 16. In the embodiment which is shown in FIG. 1, the engine cooling water is guided to the inside of the cooling device 16a where the engine cooling water is used to cool the exhaust gas. Further, each fuel injector 3 is connected through a fuel feed tube 18 to a common rail 19. This common rail 19 is connected through an electronically controlled variable discharge fuel pump 20 to a fuel tank 21. The fuel which is stored inside of the fuel tank 21 is fed by the fuel pump 20 to the inside of the common rail 19. The fuel which is fed to the inside of the common rail 19 is fed through each fuel feed tube 18 to the fuel injector 3.

On the other hand, downstream of the particulate filter 14 inside of the exhaust pipe 12a, an exhaust control valve 22 which is driven by an actuator 22a is arranged. The inside of the exhaust pipe 14 between this exhaust control valve 22 and exhaust purification catalyst 13 is connected through an EGR passage 23 to the intake pipe 6a. Inside this EGR passage 23, an electronic control type EGR control valve 24 is arranged. Further, around the EGR passage 23, a cooling device 23a is arranged for cooling the exhaust gas which flows through the inside of the EGR passage 23. In the embodiment which is shown in FIG. 1, the engine cooling water is guided to the inside of the cooling device 23a where the engine cooling water is used to cool the exhaust gas.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. Downstream of the exhaust purification catalyst 13, a temperature sensor 25 is arranged for detecting the temperature of the exhaust purification catalyst 13, and downstream of the particulate filter 14, a temperature sensor 26 is arranged for detecting the temperature of the particulate filter 14. The output signals of these temperature sensor 25,26 and intake air amount detector 8 are input through respectively corresponding AD converters 37 to the input port 35. Further, the accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, actuator 10a for driving the throttle valve, hydrocarbon feed valve 15, EGR control valve 17, fuel pump 20, and actuator 22a for driving the exhaust control valve.

As explained above, in the embodiment which is shown in FIG. 1, an exhaust gas recirculation system HPL which is comprised of the EGR passage 16 and EGR control valve 17 and an exhaust gas recirculation system LPL which is comprised of the EGR passage 23 and EGR control valve 24, that is, two exhaust gas recirculation systems, are provided. In this case, as will be understood from FIG. 1, in the exhaust gas recirculation system HPL, the exhaust gas in the exhaust manifold 5 is recirculated, while in the exhaust gas recirculation system LPL, the exhaust gas in the exhaust pipe 12a downstream of the exhaust purification catalyst 13 and the particulate filter 14 is recirculated. In this regard, in this case, the pressure of the exhaust gas in the exhaust manifold 5 is considerably higher than the pressure of the exhaust gas in the exhaust pipe 12a downstream of the exhaust purification catalyst 13 and the particulate filter 14. Therefore, the exhaust gas recirculation system HPL will hereinafter be called the "high pressure exhaust gas recirculation system" for recirculating the relatively high pressure exhaust gas in the engine exhaust passage upstream of the exhaust turbine 7b to the inside of the intake passage downstream of the compressor 7a, while the exhaust gas recirculation system LPL will hereinafter be called the "low pressure exhaust gas recirculation system" for recirculating the relatively low pressure exhaust gas in the engine exhaust passage downstream of the exhaust purification catalyst 13 and the particulate filter 14 to the inside of the intake passage upstream of the compressor 7a.

Figure 2:
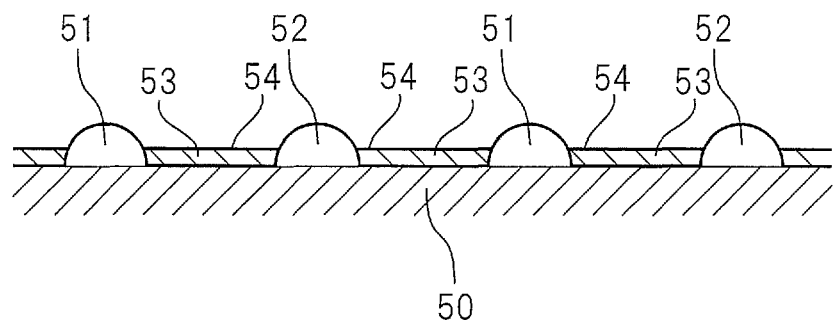
FIG. 2 is a view which schematically shows the surface part of a catalyst carrier.

FIG. 2 schematically shows a surface part of a catalyst carrier which is carried on a substrate of the exhaust purification catalyst 13. At this exhaust purification catalyst 13, as shown in FIG. 2, for example, there is provided a catalyst carrier 50 made of alumina on which precious metal catalysts 51 and 52 are carried. Furthermore, on this catalyst carrier 50, a basic layer 53 is formed which includes at least one element selected from potassium K, sodium Na, cesium Cs, or another such alkali metal, barium Ba, calcium Ca, or another such alkali earth metal, a lanthanide or another such rare earth and silver Ag, copper Cu, iron Fe, iridium Ir, or another metal able to donate electrons to $NO_X$. The exhaust gas flows along the top of the catalyst carrier 50, so the precious metal catalysts 51 and 52 can be said to be carried on the exhaust gas flow surface of the exhaust purification catalyst 13. Further, the surface of the basic layer 53 exhibits basicity, so the surface of the basic layer 53 is called the "basic exhaust gas flow surface parts 54".

On the other hand, in FIG. 2, the precious metal catalyst 51 is comprised of platinum Pt, while the precious metal catalyst 52 is comprised of rhodium Rh. Note that, in this case, both the precious metal catalysts 51 and 52 may be comprised from platinum Pt. Further, on the catalyst carrier 50 of the exhaust purification catalyst 13, in addition to platinum Pt and rhodium Rh, palladium Pd may be further carried or, instead of rhodium Rh, palladium Pd may be carried. That is, the precious metal catalysts 51 and 52 which are carried on the catalyst carrier 50 are comprised of at least one of platinum Pt, rhodium Rh and palladium Pd.

Figure 3:
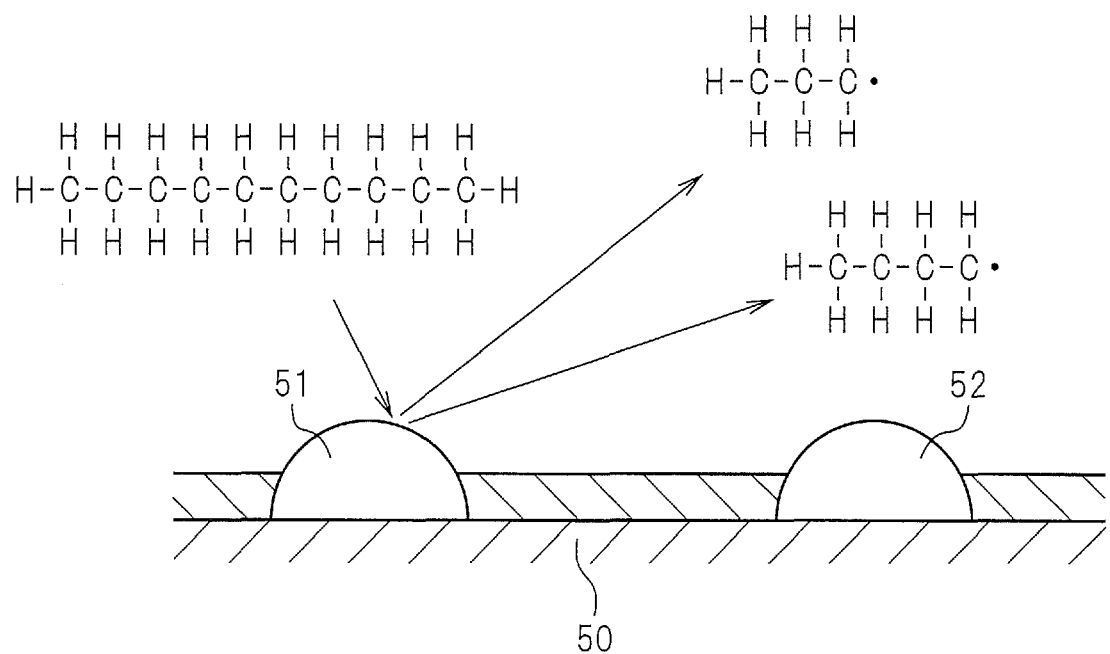
FIG. 3 is a view for explaining an oxidation reaction at an exhaust purification catalyst.

If hydrocarbons are injected from the hydrocarbon feed valve 15 into the exhaust gas, the hydrocarbons are reformed by the exhaust purification catalyst 13. In the present invention, at this time, the reformed hydrocarbons are used to remove the $NO_X$ at the exhaust purification catalyst 13. FIG. 3 schematically shows the reformation action performed at the exhaust purification catalyst 13 at this time. As shown in FIG. 3, the hydrocarbons HC which are injected from the hydrocarbon feed valve 15 become radical hydrocarbons HC with a small carbon number due to the catalyst 51.

Figure 4:
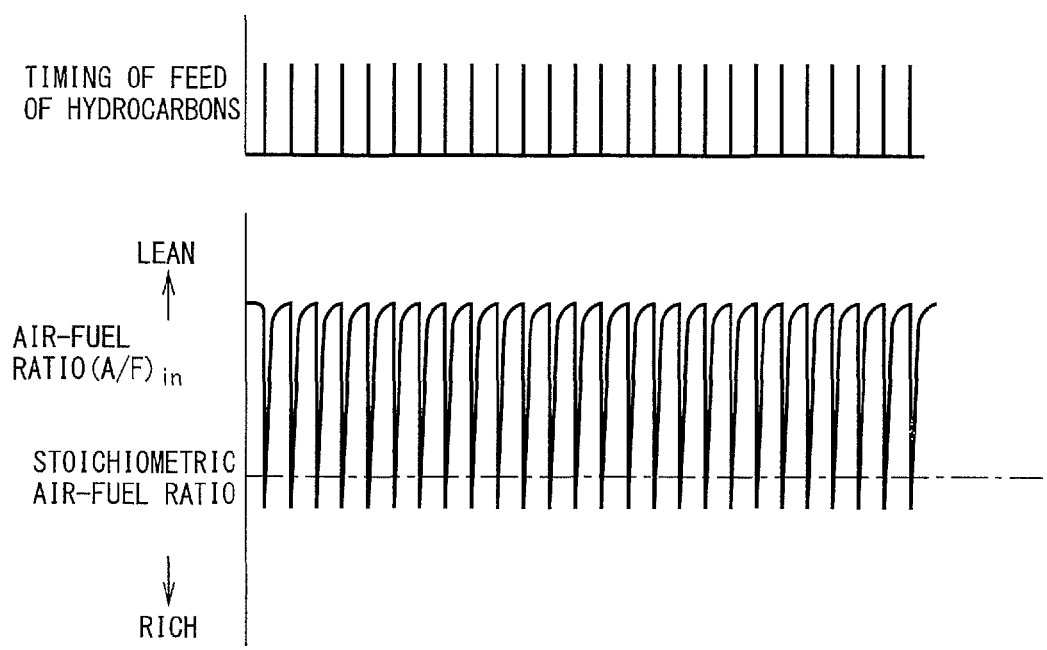
FIG. 4 is a view which shows changes in an air-fuel ratio of exhaust gas which flows into an exhaust purification catalyst.

FIG. 4 shows the feed timing of hydrocarbons from the hydrocarbon feed valve 15 and the change in the air-fuel ratio (A/F) in of the exhaust gas which flows into the exhaust purification catalyst 13. Note that, the changes in the air-fuel ratio (A/F) in depend on the change in concentration of the hydrocarbons in the exhaust gas which flows into the exhaust purification catalyst 13, so it can be said that the change in the air-fuel ratio (A/F) in shown in FIG. 4 expresses the change in concentration of the hydrocarbons. However, if the hydrocarbon concentration becomes higher, the air-fuel ratio (A/F) in becomes smaller, so, in FIG. 4, the more to the rich side the air-fuel ratio (A/F) in becomes, the higher the hydrocarbon concentration.

Figure 5:
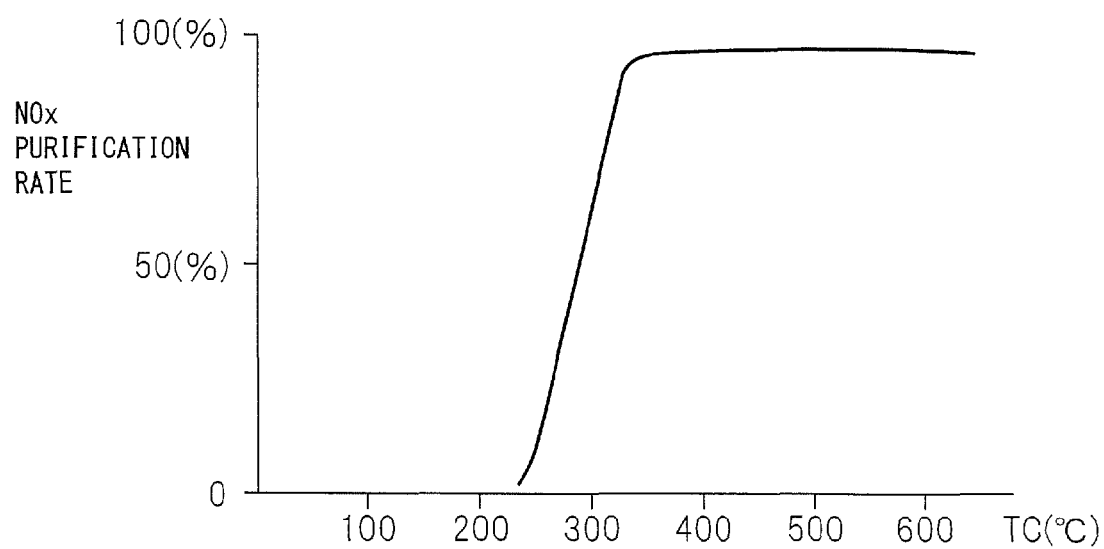
FIG. 5 is a view which shows an $NO_X$ purification rate.

FIG. 5 shows the $NO_X$ purification rate by the exhaust purification catalyst 13 with respect to the catalyst temperatures TC of the exhaust purification catalyst 13 when periodically making the concentration of hydrocarbons which flow into the exhaust purification catalyst 13 change so as to, as shown in FIG. 4, make the air-fuel ratio (A/F) in of the exhaust gas flowing to the exhaust purification catalyst 13 change. The inventors engaged in research relating to $NO_X$ purification for a long time. In the process of research, they learned that if making the concentration of hydrocarbons which flow into the exhaust purification catalyst 13 vibrate by within a predetermined range of amplitude and within a predetermined range of period, as shown in FIG. 5, an extremely high $NO_X$ purification rate is obtained even in a 400° C. or higher high temperature region.

Figure 6A:
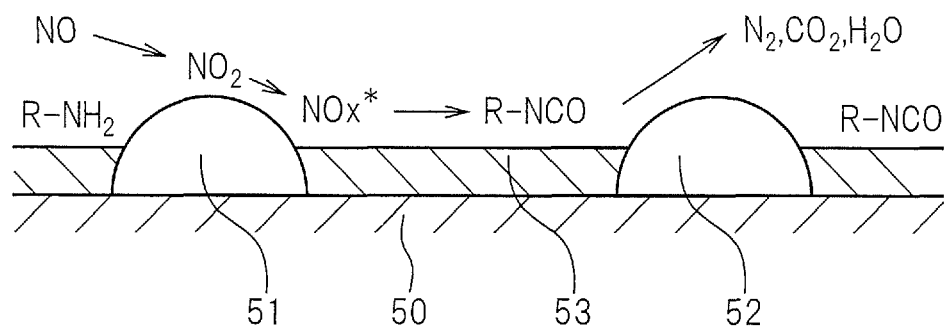
FIGS. 6A and 6B are views for explaining an oxidation reduction reaction in an exhaust purification catalyst.
Figure 6B:
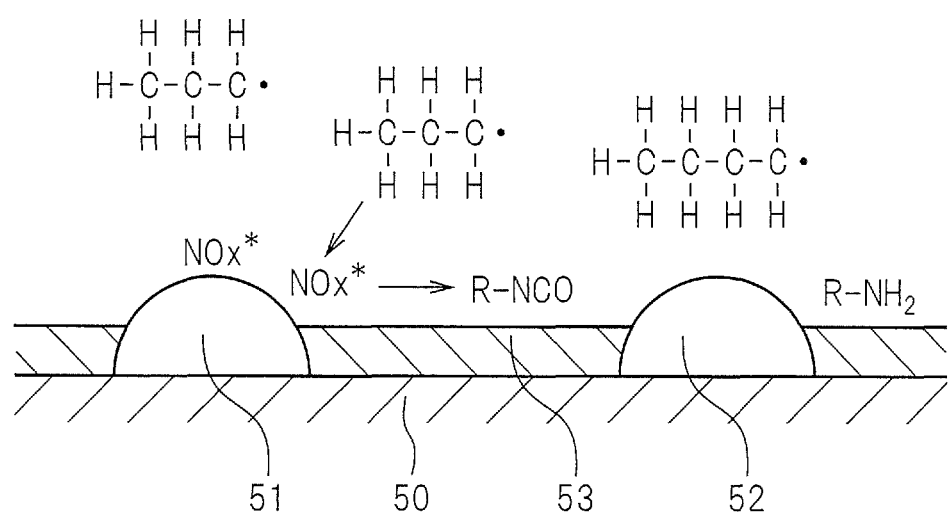

Furthermore, at this time, a large amount of reducing intermediates which contain nitrogen and hydrocarbons continues to be held or adsorbed on the surface of the basic layer 53, that is, on the basic exhaust gas flow surface parts 54 of the exhaust purification catalyst 13. It is learned that the reducing intermediates play a central role in obtaining a high $NO_X$ purification rate. Next, this will be explained with reference to FIGS. 6A and 6B. Note that, these FIGS. 6A and 6B schematically show the surface part of the catalyst carrier 50 of the exhaust purification catalyst 13. These FIGS. 6A and 6B show the reaction which is presumed to occur when the concentration of hydrocarbons which flow into the exhaust purification catalyst 13 is made to vibrate by within a predetermined range of amplitude and within a predetermined range of period.

FIG. 6A shows when the concentration of hydrocarbons which flow into the exhaust purification catalyst 13 is low, while FIG. 6B shows when hydrocarbons are fed from the hydrocarbon feed valve 15 and the concentration of hydrocarbons which flow into the exhaust purification catalyst 13 becomes higher.

Now, as will be understood from FIG. 4, the air-fuel ratio of the exhaust gas which flows into the exhaust purification catalyst 13 is maintained lean except for an instant, so the exhaust gas which flows into the exhaust purification catalyst 13 normally becomes a state of oxygen excess. At this time, part of the NO which is contained in the exhaust gas deposits on the exhaust purification catalyst 13, while part of the NO which is contained in the exhaust gas, as shown in FIG. 6A, is oxidized on the platinum 51 and becomes $NO_2$. Next, this $NO_2$ is further oxidized and becomes $NO_3$. Further, part of the $NO_2$ becomes $NO_2$. Therefore, on the platinum Pt 51, $NO_2^-$ and $NO_3$ are produced. The NO which is deposited on the exhaust purification catalyst 13 and the $NO_2^-$ and $NO_3$ which are formed on the platinum Pt 51 are strong in activity. Therefore, below, these NO, $NO_2^-$, and $NO_3$ will be referred to as the "active $NO_X^*$".

On the other hand, if hydrocarbons are fed from the hydrocarbon feed valve 15, the hydrocarbons successively deposit over the entire exhaust purification catalyst 13. The majority of the deposited hydrocarbons successively react with oxygen and are burned. Part of the deposited hydrocarbons are successively reformed and become radicalized inside of the exhaust purification catalyst 13 as shown in FIG. 3. Therefore, as shown in FIG. 6B, the hydrogen concentration around the active $NO_X^*$ becomes higher. In this regard, if, after the active $NO_X^*$ is produced, the state of a high oxygen concentration around the active $NO_X^*$ continues for a constant time or more, the active $NO_X^*$ is oxidized and is absorbed in the form of nitrate ions $NO_3^-$ inside the basic layer 53. However, if, before this constant time elapses, the hydrocarbon concentration around the active $NO_X^*$ becomes higher, as shown in FIG. 6B, the active $NO_X^*$ reacts on the platinum 51 with the radical hydrocarbons HC to thereby form the reducing intermediates. The reducing intermediates are adhered or adsorbed on the surface of the basic layer 53.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. This isocyanate compound R—NCO becomes an amine compound R—$NH_2$ if hydrolyzed. However, in this case, what is hydrolyzed is considered to be part of the isocyanate compound R—NCO. Therefore, as shown in FIG. 6B, the majority of the reducing intermediates which are held or adsorbed on the surface of the basic layer 53 is believed to be the isocyanate compound R—NCO and amine compound R—$NH_2$.

On the other hand, as shown in FIG. 6B, if the produced reducing intermediates are surrounded by the hydrocarbons HC, the reducing intermediates are blocked by the hydrocarbons HC and the reaction will not proceed any further. In this case, if the concentration of hydrocarbons which flow into the exhaust purification catalyst 13 is lowered and then the hydrocarbons which are deposited around the reducing intermediates will be oxidized and consumed and thereby the concentration of oxygen around the reducing intermediates becomes higher, the reducing intermediates react with the $NO_X$ in the exhaust gas and the active $NO_X^*$, or react with the surrounding oxygen, or break down on their own. Due to this, as shown in FIG. 6A, the reducing intermediates R—NCO and R—$NH_2$ are converted to $N_2$, $CO_2$, and $H_2O$, therefore the $NO_X$ is removed.

In this way, in the exhaust purification catalyst 13, by making the concentration of hydrocarbons which flow into the exhaust purification catalyst 13 higher, reducing intermediates are produced. When the concentration of hydrocarbons which flow into the exhaust purification catalyst 13 is lowered, then the oxygen concentration is raised, the reducing intermediates react with the $NO_X$ in the exhaust gas, the active $NO_X^*$ and oxygen, or break down on their own whereby the $NO_X$ is removed. That is, in order for the exhaust purification catalyst 13 to remove the $NO_X$, the concentration of hydrocarbons which flow into the exhaust purification catalyst 13 has to be periodically changed.

Of course, in this case, it is necessary to raise the hydrocarbon concentration to a concentration sufficiently high for producing the reducing intermediates and it is necessary to lower the hydrocarbon concentration to a concentration sufficiently low for making the produced reducing intermediates react with the $NO_X$ in the exhaust gas, the active $NO_X^*$ and oxygen or break down on their own. That is, it is necessary to make the concentration of hydrocarbons which flow into the exhaust purification catalyst 13 vibrate by within a predetermined range of amplitude. Note that, in this case, it is necessary to hold these reducing intermediates on the basic layer 53, that is, the basic exhaust gas flow surface parts 54, until the produced reducing intermediates R—NCO and R—$NH_2$ react with the $NO_X$ in the exhaust gas, the active $NO_X^*$ and oxygen or break down themselves. For this reason, the basic exhaust gas flow surface parts 54 are provided.

On the other hand, if lengthening the feed period of the hydrocarbons, the time until the oxygen concentration becomes higher becomes longer in the period after the hydrocarbons are fed until the hydrocarbons are next fed. Therefore, the active $NO_X^*$ is absorbed in the basic layer 53 in the form of nitrates without producing reducing intermediates. To avoid this, it is necessary to make the concentration of hydrocarbons which flow into the exhaust purification catalyst 13 vibrate by within a predetermined range of period.

Therefore, in this embodiment of the present invention, to make the $NO_X$ which is contained in the exhaust gas and the reformed hydrocarbons react and produce the reducing intermediates R—NCO and R—$NH_2$ containing nitrogen and hydrocarbons, the precious metal catalysts 51 and 52 are carried on the exhaust gas flow surface of the exhaust purification catalyst 13. To hold the produced reducing intermediates R—NCO and R—$NH_2$ inside the exhaust purification catalyst 13, the basic exhaust gas flow surface parts 54 are formed around the precious metal catalysts 51 and 52. The reducing intermediates R—NCO and R—$NH_2$ which are held on the basic exhaust gas flow surface parts 54 are converted to $N_2$, $CO_2$, and $H_2O$. The vibration period of the hydrocarbon concentration is made the vibration period required for continuation of the production of the reducing intermediates R—NCO and R—$NH_2$. Incidentally, in the example shown in FIG. 4, the injection interval is made 3 seconds.

Figure 7A:
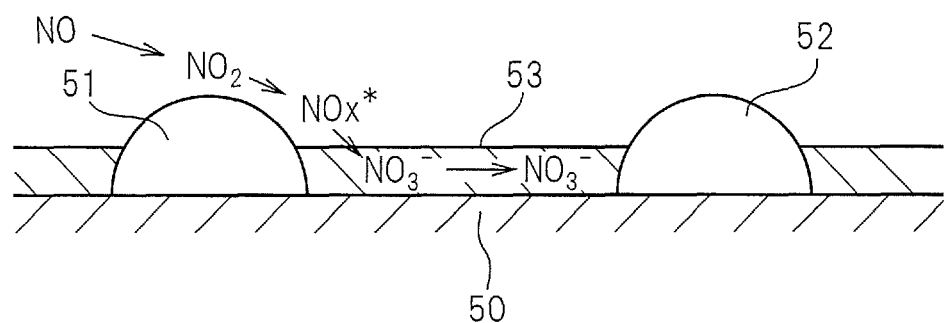
FIGS. 7A and 7B are views for explaining an oxidation reduction reaction in an exhaust purification catalyst.

If the vibration period of the hydrocarbon concentration, that is, the feed period of the hydrocarbons HC, is made longer than the above predetermined range of period, the reducing intermediates R—NCO and R—$NH_2$ disappear from the surface of the basic layer 53. At this time, the active $NO_X^*$ which was produced on the platinum Pt 53, as shown in FIG. 7A, diffuses in the basic layer 53 in the form of nitrate ions $NO_3^-$ and becomes nitrates. That is, at this time, the $NO_X$ in the exhaust gas is absorbed in the form of nitrates inside of the basic layer 53.

Figure 7B:
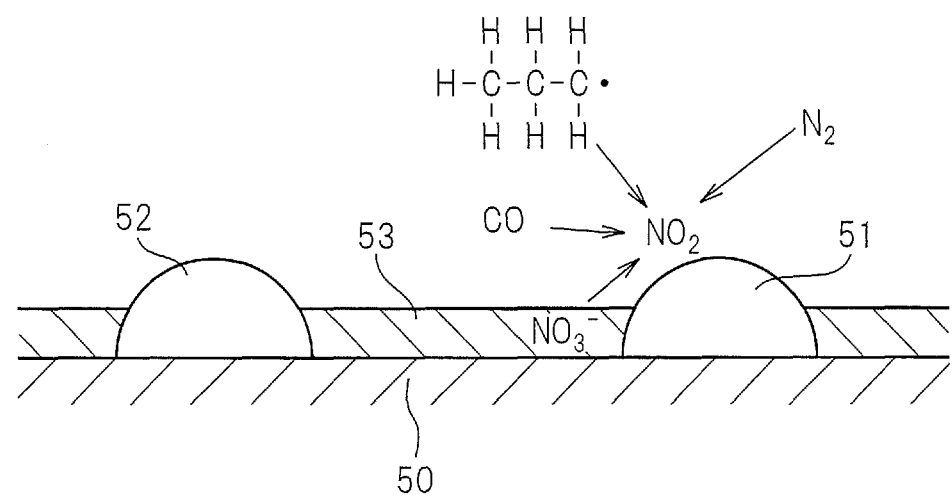

On the other hand, FIG. 7B shows the case where the air-fuel ratio of the exhaust gas which flows into the exhaust purification catalyst 13 is made the stoichiometric air-fuel ratio or rich when the $NO_X$ is absorbed in the form of nitrates inside of the basic layer 53. In this case, the oxygen concentration in the exhaust gas falls, so the reaction proceeds in the opposite direction ($NO_3^- \rightarrow NO_2$), and consequently the nitrates absorbed in the basic layer 53 successively become nitrate ions $NO_3^-$ and, as shown in FIG. 7B, are released from the basic layer 53 in the form of $NO_2$. Next, the released $NO_2$ is reduced by the hydrocarbons HC and CO contained in the exhaust gas.

Figure 8:
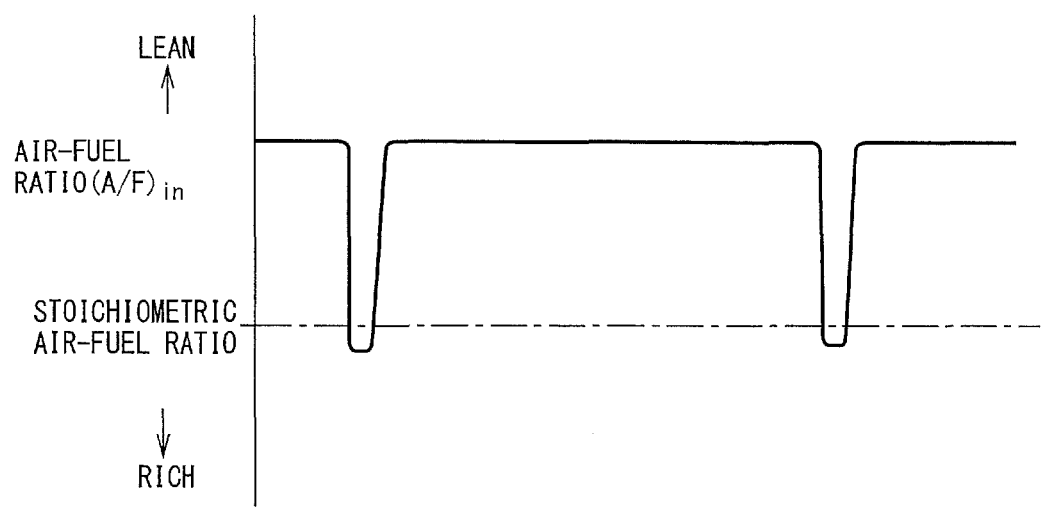
FIG. 8 is a view which shows changes in an air-fuel ratio of exhaust gas which flows into an exhaust purification catalyst.

FIG. 8 shows the case of making the air-fuel ratio (A/F) in of the exhaust gas which flows into the exhaust purification catalyst 13 temporarily rich slightly before the $NO_X$ absorption ability of the basic layer 53 becomes saturated. Note that, in the example shown in FIG. 8, the time interval of this rich control is 1 minute or more. In this case, the $NO_X$ which was absorbed in the basic layer 53 when the air-fuel ratio (A/F) in of the exhaust gas was lean is released all at once from the basic layer 53 and reduced when the air-fuel ratio (A/F) in of the exhaust gas is made temporarily rich. Therefore, in this case, the basic layer 53 plays the role of an absorbent for temporarily absorbing $NO_X$.

Note that, at this time, sometimes the basic layer 53 temporarily adsorbs the $NO_X$. Therefore, if using term of "storage" as a term including both "absorption" and "adsorption", at this time, the basic layer 53 performs the role of an $NO_X$ storage agent for temporarily storing the $NO_X$. That is, in this case, if the ratio of the air and fuel (hydrocarbons) which are supplied into the engine intake passage, combustion chambers 2, and upstream of the exhaust purification catalyst 13 in the exhaust passage is referred to as "the air-fuel ratio of the exhaust gas", the exhaust purification catalyst 13 functions as an $NO_X$ storage catalyst which stores the $NO_X$ when the air-fuel ratio of the exhaust gas is lean and releases the stored $NO_X$ when the oxygen concentration in the exhaust gas falls.

Figure 9:
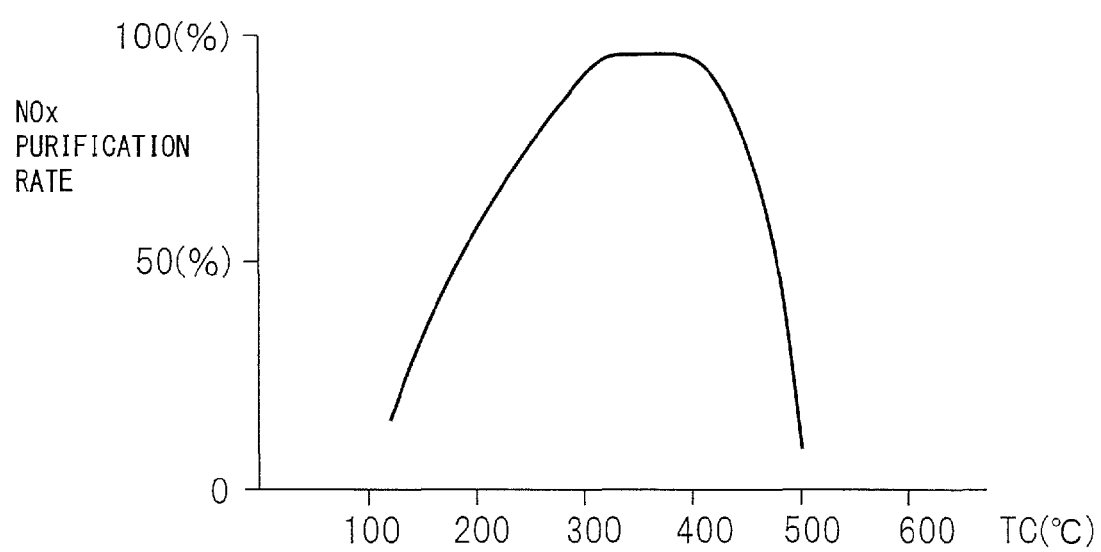
FIG. 9 is a view which shows an $NO_X$ purification rate.

FIG. 9 shows the $NO_X$ purification rate when making the exhaust purification catalyst 13 function as an $NO_X$ storage catalyst in this way. Note that, the abscissa of the FIG. 9 shows the catalyst temperature TC of the exhaust purification catalyst 13. When making the exhaust purification catalyst 13 function as an $NO_X$ storage catalyst, as shown in FIG. 9, when the catalyst temperature TC is 300° C. to 400° C., an extremely high $NO_X$ purification rate is obtained, but when the catalyst temperature TC becomes a 400° C. or higher high temperature, the $NO_X$ purification rate falls.

In this way, when the catalyst temperature TC becomes 400° C. or more, the $NO_X$ purification rate falls because if the catalyst temperature TC becomes 400° C. or more, the nitrates break down by heat and are released in the form of $NO_2$ from the exhaust purification catalyst 13. That is, so long as storing $NO_X$ in the form of nitrates, when the catalyst temperature TC is high, it is difficult to obtain a high $NO_X$ purification rate. However, in the new $NO_X$ purification method shown from FIG. 4 to FIGS. 6A and 6B, as will be understood from FIGS. 6A and 6B, nitrates are not formed or even if formed are extremely small in amount, consequently, as shown in FIG. 5, even when the catalyst temperature TC is high, a high $NO_X$ purification rate is obtained.

Therefore, in an embodiment of the present invention, to use this new $NO_X$ purification method to be able to remove $NO_X$, the hydrocarbon feed valve 15 for feeding hydrocarbons is arranged inside of the engine exhaust passage, the exhaust purification catalyst 13 for causing $NO_X$ contained in exhaust gas and reformed hydrocarbons to react is arranged downstream of the hydrocarbon feed valve 15 in the engine exhaust passage, precious metal catalysts 51 and 52 are carried on the exhaust gas flow surface of the exhaust purification catalyst 13, basic exhaust gas flow surface parts 54 are formed around the precious metal catalysts 51 and 52, the exhaust purification catalyst 13 has the property of reducing the $NO_X$ which is contained in exhaust gas if the concentration of hydrocarbons which flow into the exhaust purification catalyst 13 is made to vibrate by within a predetermined range of amplitude and within a predetermined range of period and has the property of being increased in storage amount of $NO_X$ which is contained in exhaust gas if the vibration period of the hydrocarbon concentration is made longer than this predetermined range, and, at the time of engine operation, the hydrocarbons is injected from the hydrocarbon feed valve 15 at a predetermined period to thereby reduce the $NO_X$ which is contained in the exhaust gas in the exhaust purification catalyst 13.

That is, the $NO_X$ purification method which is shown from FIG. 4 to FIGS. 6A and 6B can be said to be a new $NO_X$ purification method designed to remove $NO_X$ without forming almost any nitrates in the case of using an exhaust purification catalyst which carries precious metal catalysts and forms a basic layer which can absorb $NO_X$. In actuality, when using this new $NO_X$ purification method, the nitrates which are detected from the basic layer 53 become much smaller in amount compared with the case where making the exhaust purification catalyst 13 function as an $NO_X$ storage catalyst. Note that, this new $NO_X$ purification method will be referred to below as the "first $NO_X$ purification method".

Next, referring to FIG. 10 to FIG. 15, this first $NO_X$ purification method will be explained in a bit more detail.

Figure 10:
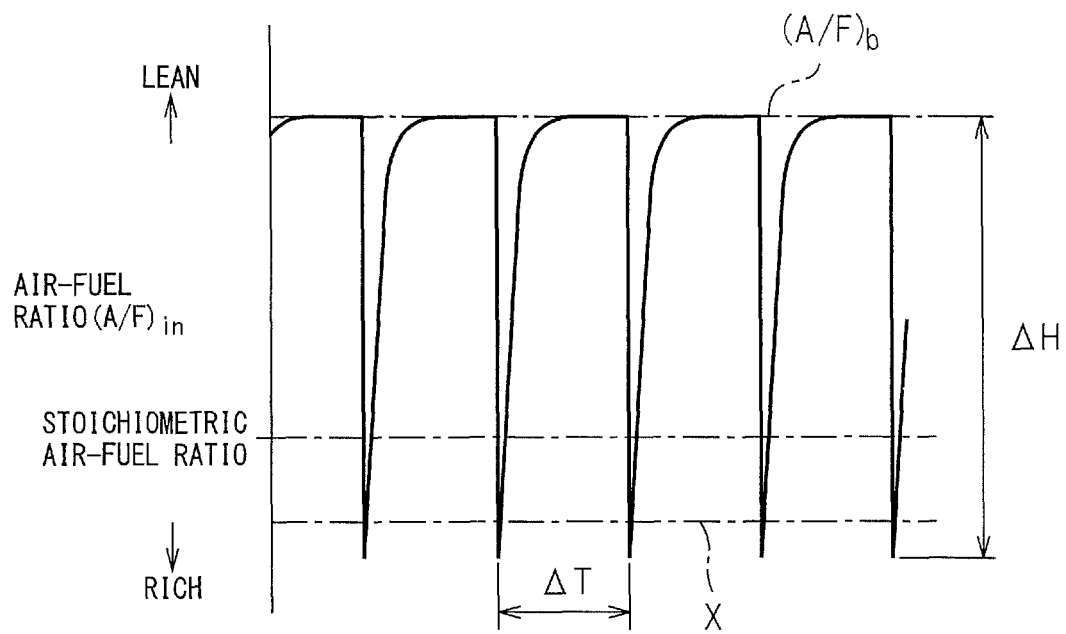
FIG. 10 is a time chart which shows changes in an air-fuel ratio of exhaust gas which flows into an exhaust purification catalyst.

FIG. 10 shows enlarged the change in the air-fuel ratio (A/F) in shown in FIG. 4. Note that, as explained above, the change in the air-fuel ratio (A/F) in of the exhaust gas which flows into this exhaust purification catalyst 13 simultaneously shows the change in concentration of the hydrocarbons which flow into the exhaust purification catalyst 13. Note that, in FIG. 10, ΔH shows the amplitude of the change in concentration of hydrocarbons HC which flow into the exhaust purification catalyst 13, while ΔT shows the vibration period of the concentration of the hydrocarbons which flow into the exhaust purification catalyst 13.

Furthermore, in FIG. 10, (A/F)b shows the base air-fuel ratio which shows the air-fuel ratio of the combustion gas for generating the engine output. In other words, this base air-fuel ratio (A/F)b shows the air-fuel ratio of the exhaust gas which flows into the exhaust purification catalyst 13 when stopping the feed of hydrocarbons. On the other hand, in FIG. 10, X shows the upper limit of the air-fuel ratio (A/F) in used for producing the reducing intermediates without the produced active $NO_X$* being stored in the form of nitrates inside the basic layer 53 much at all. To make the active $NO_X$* and the reformed hydrocarbons react to produce reducing intermediates, the air-fuel ratio (A/F) in has to be made lower than this upper limit X of the air-fuel ratio.

In other words, in FIG. 10, X shows the lower limit of the hydrocarbon concentration required for making the active $NO_X$* and reformed hydrocarbons react to produce reducing intermediates. To produce the reducing intermediates, the hydrocarbon concentration has to be made higher than this lower limit X. In this case, whether the reducing intermediates are produced is determined by the ratio of the oxygen concentration and hydrocarbon concentration around the active $NO_X$*, that is, the air-fuel ratio (A/F) in. The upper limit X of the air-fuel ratio required for producing the reducing intermediates will below be called the "demanded minimum air-fuel ratio".

In the example shown in FIG. 10, the demanded minimum air-fuel ratio X is rich, therefore, in this case, to form the reducing intermediates, the air-fuel ratio (A/F) in is instantaneously made the demanded minimum air-fuel ratio X or less, that is, rich. As opposed to this, in the example shown in FIG. 11, the demanded minimum air-fuel ratio X is lean. In this case, the air-fuel ratio (A/F) in is maintained lean while periodically reducing the air-fuel ratio (A/F) in so as to form the reducing intermediates.

In this case, whether the demanded minimum air-fuel ratio X becomes rich or becomes lean depends on the oxidizing power of the exhaust purification catalyst 13. In this case, the exhaust purification catalyst 13, for example, becomes stronger in oxidizing power if increasing the carried amount of the precious metal 51 and becomes stronger in oxidizing power if strengthening the acidity. Therefore, the oxidizing power of the exhaust purification catalyst 13 changes due to the carried amount of the precious metal 51 or the strength of the acidity.

Figure 11:
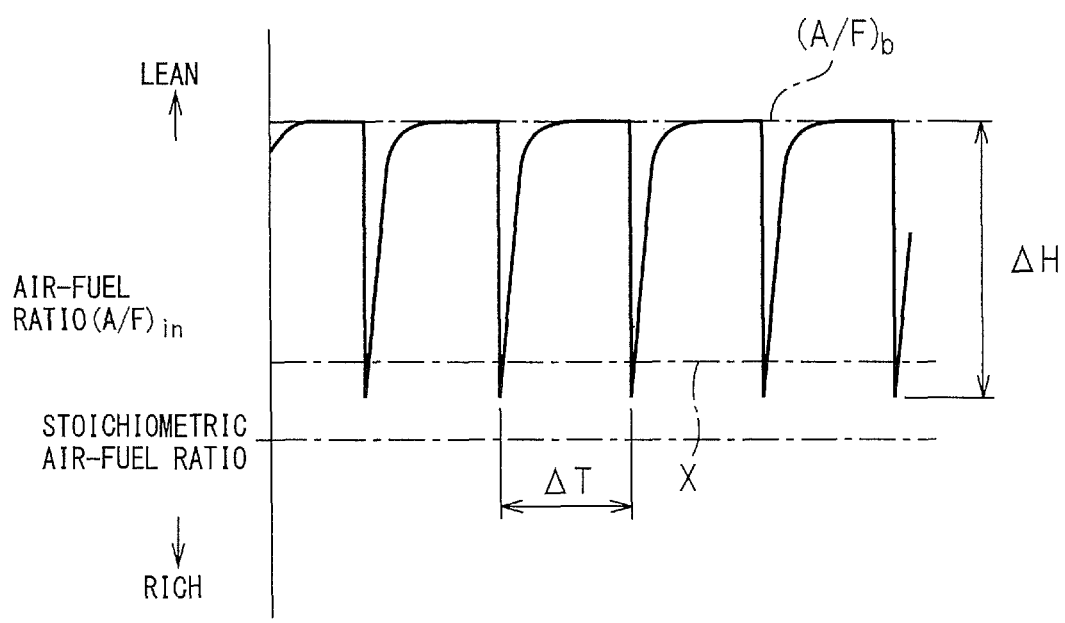
FIG. 11 is a time chart which shows changes in an air-fuel ratio of exhaust gas which flows into an exhaust purification catalyst.

Now, if using an exhaust purification catalyst 13 with a strong oxidizing power, as shown in FIG. 11, if maintaining the air-fuel ratio (A/F) in lean while periodically lowering the air-fuel ratio (A/F) in, the hydrocarbons end up becoming completely oxidized when the air-fuel ratio (A/F) in is reduced. As a result, reducing intermediates can no longer be produced. As opposed to this, when using an exhaust purification catalyst 13 with a strong oxidizing power, as shown in FIG. 10, if making the air-fuel ratio (A/F) in periodically rich, when the air-fuel ratio (A/F) in is made rich, part of the hydrocarbons will not be completely oxidized, but will be partially oxidized, that is, the hydrocarbons will be reformed, consequently reducing intermediates will be produced. Therefore, when using an exhaust purification catalyst 13 with a strong oxidizing power, the demanded minimum air-fuel ratio X has to be made rich.

On the other hand, when using an exhaust purification catalyst 13 with a weak oxidizing power, as shown in FIG. 11, if maintaining the air-fuel ratio (A/F) in lean while periodically lowering the air-fuel ratio (A/F) in, part of the hydrocarbons will not be completely oxidized, but will be partially oxidized, that is, the hydrocarbons will be reformed, and consequently reducing intermediates will be produced. As opposed to this, when using an exhaust purification catalyst 13 with a weak oxidizing power, as shown in FIG. 10, if making the air-fuel ratio (A/F) in periodically rich, a large amount of hydrocarbons will be exhausted from the exhaust purification catalyst 13 without being oxidized and consequently the amount of hydrocarbons which is wastefully consumed will increase. Therefore, when using an exhaust purification catalyst 13 with a weak oxidizing power, the demanded minimum air-fuel ratio X has to be made lean.

Figure 12:
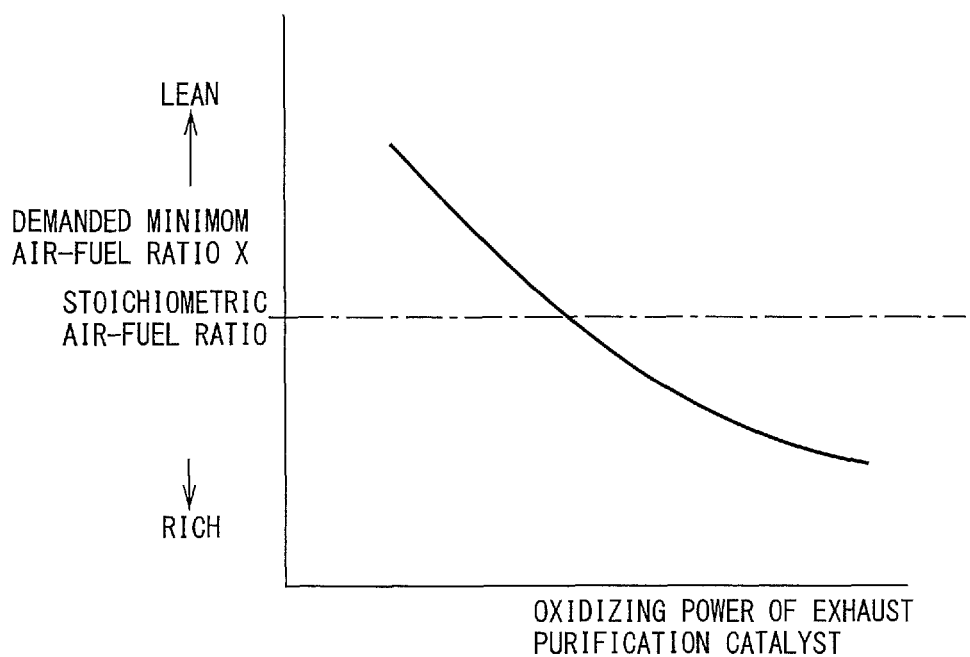
FIG. 12 is a view which shows a relationship between an oxidizing power of an exhaust purification catalyst and a demanded minimum air-fuel ratio X.

That is, it is learned that the demanded minimum air-fuel ratio X, as shown in FIG. 12, has to be reduced the stronger the oxidizing power of the exhaust purification catalyst 13. In this way, the demanded minimum air-fuel ratio X becomes lean or rich due to the oxidizing power of the exhaust purification catalyst 13. Below, taking as example the case where the demanded minimum air-fuel ratio X is rich, the amplitude of the change in concentration of hydrocarbons which flow into the exhaust purification catalyst 13 and the vibration period of the concentration of hydrocarbons which flow into the exhaust purification catalyst 13 will be explained.

Now, if the base air-fuel ratio (A/F)b becomes larger, that is, if the oxygen concentration in the exhaust gas before the hydrocarbons are fed becomes higher, the feed amount of hydrocarbons required for making the air-fuel ratio (A/F) in the demanded minimum air-fuel ratio X or less increases and along with this the excess amount of hydrocarbons which do not contribute to the production of the reducing intermediates also increases. In this case, to remove the $NO_X$ well, as explained above, it is necessary to make the excess hydrocarbons oxidize. Therefore, to remove the $NO_X$ well, the larger the amount of excess hydrocarbons, the larger the amount of oxygen which is required.

In this case, if raising the oxygen concentration in the exhaust gas, the amount of oxygen can be increased. Therefore, to remove the $NO_X$ well, when the oxygen concentration in the exhaust gas before the hydrocarbons are fed is high, it is necessary to raise the oxygen concentration in the exhaust gas after feeding the hydrocarbons. That is, the higher the oxygen concentration in the exhaust gas before the hydrocarbons are fed, the larger the amplitude of the hydrocarbon concentration has to be made.

Figure 13:
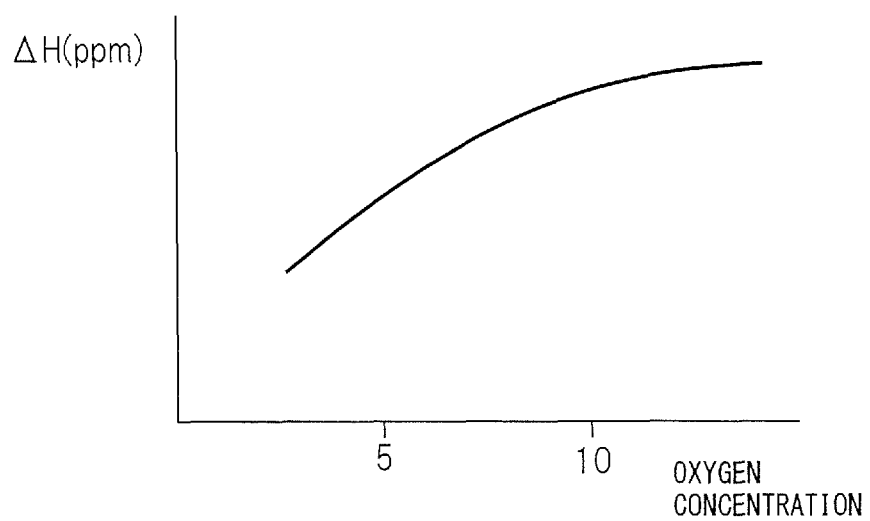
FIG. 13 is a view which shows a relationship between a concentration of oxygen in exhaust gas and an amplitude ΔH of hydrocarbon concentration which gives the same $NO_X$ purification rate.

FIG. 13 shows the relationship between the oxygen concentration in the exhaust gas before the hydrocarbons are fed and the amplitude $\Delta H$ of the hydrocarbon concentration when the same $NO_X$ purification rate is obtained. To obtain the same $NO_X$ purification rate from FIG. 13, it is learned that the higher the oxygen concentration in the exhaust gas before the hydrocarbons are fed, the greater the amplitude $\Delta H$ of the hydrocarbon concentration has to be made. That is, to obtain the same $NO_X$ purification rate, the higher the base air-fuel ratio (A/F)b, the greater the amplitude $\Delta T$ of the hydrocarbon concentration has to be made. In other words, to remove the $NO_X$ well, the lower the base air-fuel ratio (A/F)b, the more the amplitude $\Delta T$ of the hydrocarbon concentration can be reduced.

Figure 14:
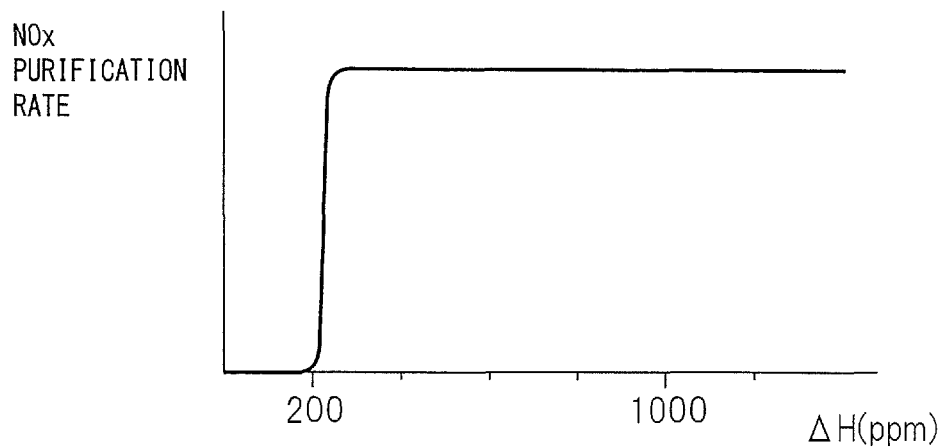
FIG. 14 is a view which shows a relationship between an amplitude ΔH of hydrocarbon concentration and an $NO_X$ purification rate.

In this regard, the base air-fuel ratio (A/F)b becomes the lowest at the time of an acceleration operation. At this time, if the amplitude $\Delta H$ of the hydrocarbon concentration is about 200 ppm, it is possible to remove the $NO_X$ well. The base air-fuel ratio (A/F)b is normally larger than the time of acceleration operation. Therefore, as shown in FIG. 14, if the amplitude $\Delta H$ of the hydrocarbon concentration is 200 ppm or more, an excellent $NO_X$ purification rate can be obtained.

On the other hand, it is learned that when the base air-fuel ratio (A/F)b is the highest, if making the amplitude $\Delta H$ of the hydrocarbon concentration 10000 ppm or so, an excellent $NO_X$ purification rate is obtained. Therefore, in the present invention, the predetermined range of the amplitude of the hydrocarbon concentration is made 200 ppm to 10000 ppm.

Figure 15:
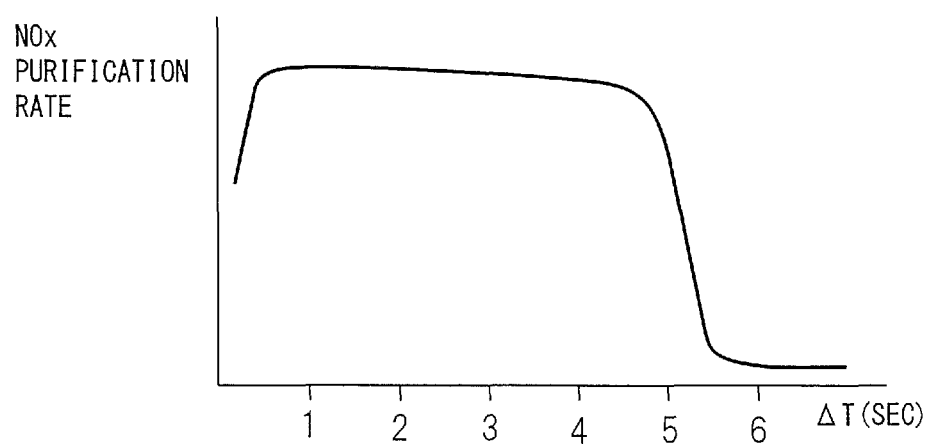
FIG. 15 is a view which shows a relationship between a vibration period ΔT of hydrocarbon concentration and an $NO_X$ purification rate.

Further, if the vibration period $\Delta T$ of the hydrocarbon concentration becomes longer, the time period where the oxygen concentration around the active $NO_X^*$ becomes higher becomes longer in the time period after the hydrocarbons are fed to when the hydrocarbons are next fed. In this case, in the embodiment which is shown in FIG. 1, if the vibration period $\Delta T$ of the hydrocarbon concentration becomes longer than about 5 seconds, the active $NO_X^*$ starts to be absorbed in the form of nitrates inside the basic layer 53. Therefore, as shown in FIG. 15, if the vibration period $\Delta T$ of the hydrocarbon concentration becomes longer than about 5 seconds, the $NO_X$ purification rate falls. Therefore, the vibration period $\Delta T$ of the hydrocarbon concentration has to be made 5 seconds or less.

On the other hand, in this embodiment according to the present invention, if the vibration period $\Delta T$ of the hydrocarbon concentration becomes about 0.3 second or less, the fed hydrocarbons start to build up on the exhaust gas flow surface of the exhaust purification catalyst 13, therefore, as shown in FIG. 15, if the vibration period $\Delta T$ of the hydrocarbon concentration becomes about 0.3 second or less, the $NO_X$ purification rate falls. Therefore, in the present invention, the vibration period of the hydrocarbon concentration is made from 0.3 second to 5 seconds.

Figure 16A:
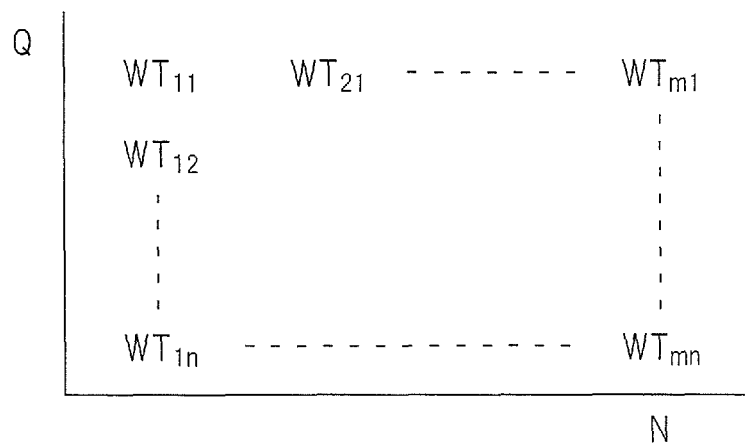
FIGS. 16A and 16B are views which show the injection time of hydrocarbons etc.
Figure 16B:
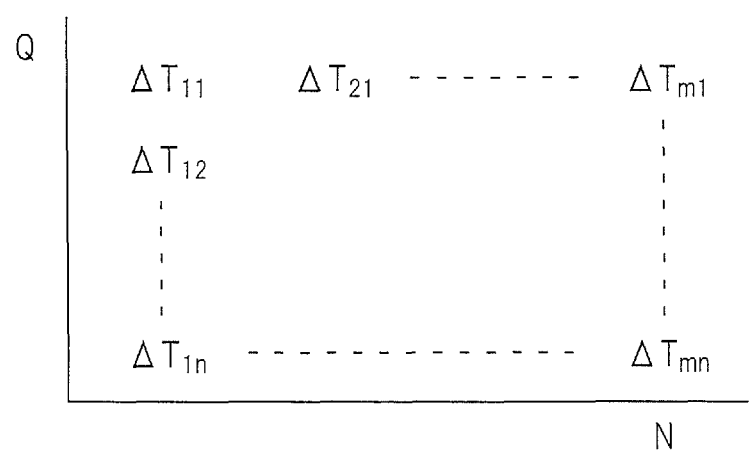

Now then, in this embodiment according to the present invention, control is performed so as to change the injection amount and injection timing of hydrocarbons from the hydrocarbon feed valve 15 so that the amplitude $\Delta H$ and vibration period $\Delta T$ of the hydrocarbon concentration become the optimal values for the engine operating state. In this case, in this embodiment according to the present invention, the optimum hydrocarbon injection amount WT in a normal operating state where an $NO_X$ purification action by the first $NO_X$ purification method is performed while performing an exhaust gas recirculation action by the low pressure exhaust gas recirculation system LPL is stored as a function of the injection amount Q from fuel injectors 3 and the engine speed N in the form of a map such as shown in FIG. 16A in advance in the ROM 32. Further, the optimum injection period $\Delta T$ of hydrocarbons in this normal operating state is stored as a function of the injection amount Q from the fuel injectors 3 and the engine speed N in the form of a map such as shown in FIG. 16B in advance in the ROM 32. Simultaneously, the optimum hydrocarbon injection amount WT and injection period $\Delta T$ when an $NO_X$ purification action by the first $NO_X$ purification method is performed while performing an exhaust gas recirculation action by the high pressure exhaust gas recirculation system HPL are also stored as functions of the injection amount Q from the fuel injectors 3 and the engine speed N respectively in advance in the ROM 32.

In this regard, if hydrocarbons are injected from the hydrocarbon feed valve 15, part of the hydrocarbons is partially oxidized, but the majority of the hydrocarbons is completely oxidized. Therefore, if hydrocarbons are injected from the hydrocarbon feed valve 15, a large amount of carbon dioxide $CO_2$ is generated at the exhaust purification catalyst 13. At this time, if assuming the exhaust gas recirculation action is performed by the low pressure exhaust gas recirculation system LPL, the large amount of carbon dioxide $CO_2$ which is generated at the exhaust purification catalyst 13 is recirculated through the EGR passage 23 of the low pressure exhaust gas recirculation system LPL and the intake passages 6a and 6b to the inside of the combustion chamber 2. In this way, if a large amount of carbon dioxide $CO_2$ is recirculated to the inside of the combustion chamber 2, the amount of air which is fed to the inside of the combustion chamber 2 temporarily decreases and the air-fuel ratio of the gas which is burned in the combustion chamber 2 temporarily drops. As a result, the air-fuel ratio of the exhaust gas which is exhausted from the combustion chamber 2, that is, the air-fuel ratio of the exhaust gas which flows into the exhaust purification catalyst 13, temporarily drops.

In this way, if hydrocarbons are injected from the hydrocarbon feed valve 15 when a recirculation action of exhaust gas is performed by the low pressure exhaust gas recirculation system LPL, the air-fuel ratio of the exhaust gas which flows into the exhaust purification catalyst 13 temporarily drops. When the air-fuel ratio of the exhaust gas which flows into the exhaust purification catalyst 13 temporarily drops in this way, if hydrocarbons are injected from the hydrocarbon feed valve 15 in synchronization with the temporary drop in the air-fuel ratio of the exhaust gas, a small amount of hydrocarbons can be used to make the air-fuel ratio of the exhaust gas which flows into the exhaust purification catalyst 13 the demanded minimum air-fuel ratio or less. That is, if hydrocarbons are injected from the hydrocarbon feed valve 15 in synchronization with the temporary drop of the exhaust purification catalyst 13, the amount of feed of hydrocarbons which is necessary for removing $NO_x$ by the first $NO_x$ removal method can be decreased.

Figure 17:
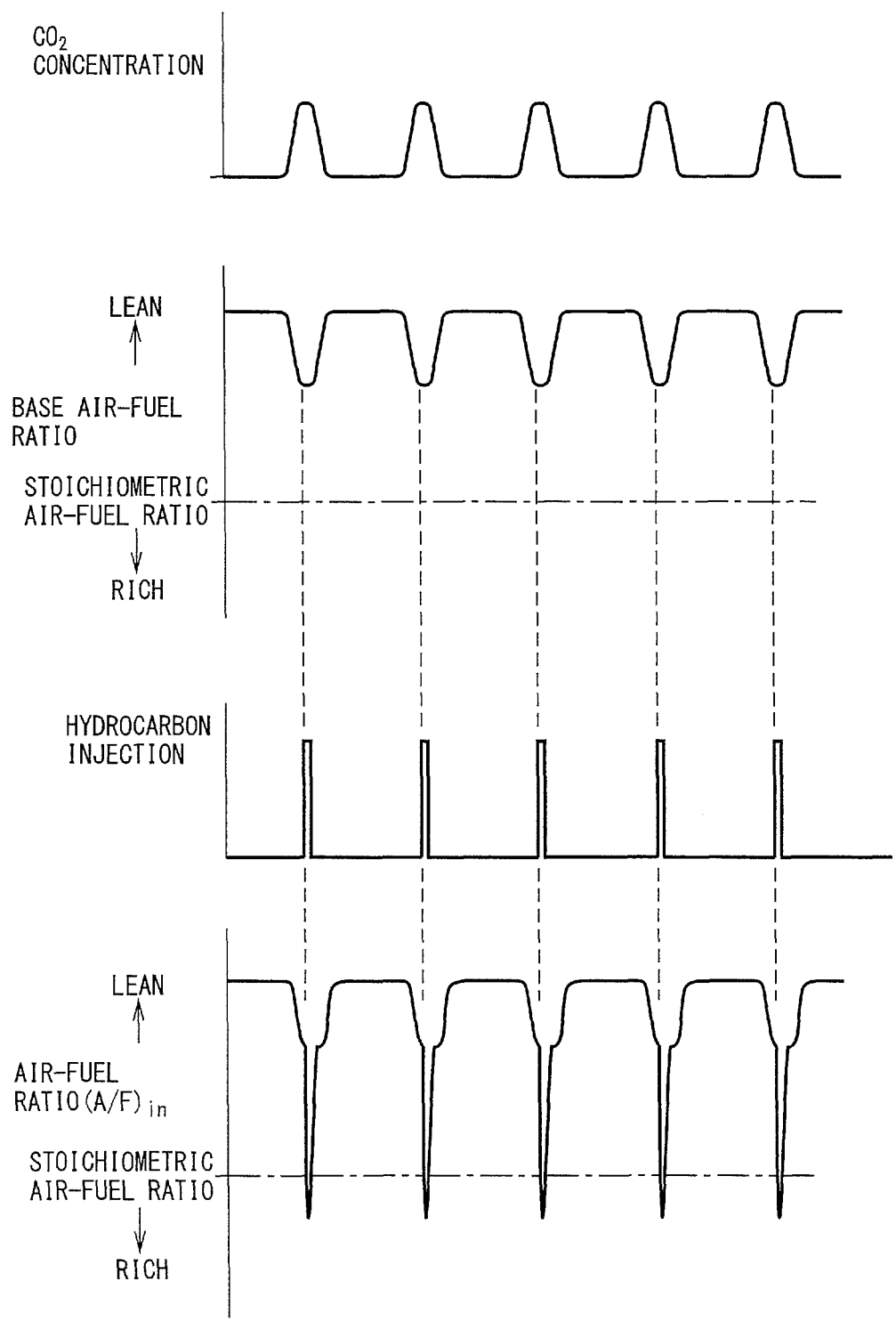
FIG. 17 is a view which shows changes in the air-fuel ratio of the exhaust gas which flows into an exhaust purification catalyst.

Therefore, in the present invention, as shown in FIG. 17, when the concentration of the recirculated carbon dioxide $CO_2$ in the exhaust gas which flows into the exhaust purification catalyst 13 temporarily increases, that is, when the base air-fuel ratio of the exhaust gas which flows into the exhaust purification catalyst 13 temporarily drops, hydrocarbons are injected from the hydrocarbon feed valve 15 to make the air-fuel ratio (A/F) in of the exhaust gas which flows into the exhaust purification catalyst 13 rich. That is, in the present invention, when the exhaust gas recirculation action by the low pressure exhaust gas recirculation system LPL is being performed, if hydrocarbons are injected from the hydrocarbon feed valve 15, the carbon dioxide which is generated at the exhaust purification catalyst 13 is recirculated. When the time which is required for recirculation of carbon dioxide elapses after the injection of the hydrocarbons, the recirculation action of the carbon dioxide causes a temporary drop in the air-fuel ratio of the inflowing exhaust gas which flows into the exhaust purification catalyst 13. When injecting hydrocarbons from the hydrocarbon feed valve 15 by a predetermined period so as to perform the $NO_x$ removal action by the first $NO_x$ removal method, hydrocarbons are injected from the hydrocarbon feed valve 15 in synchronization with the temporary drop in the air-fuel ratio of the inflowing exhaust gas.

Figure 18:
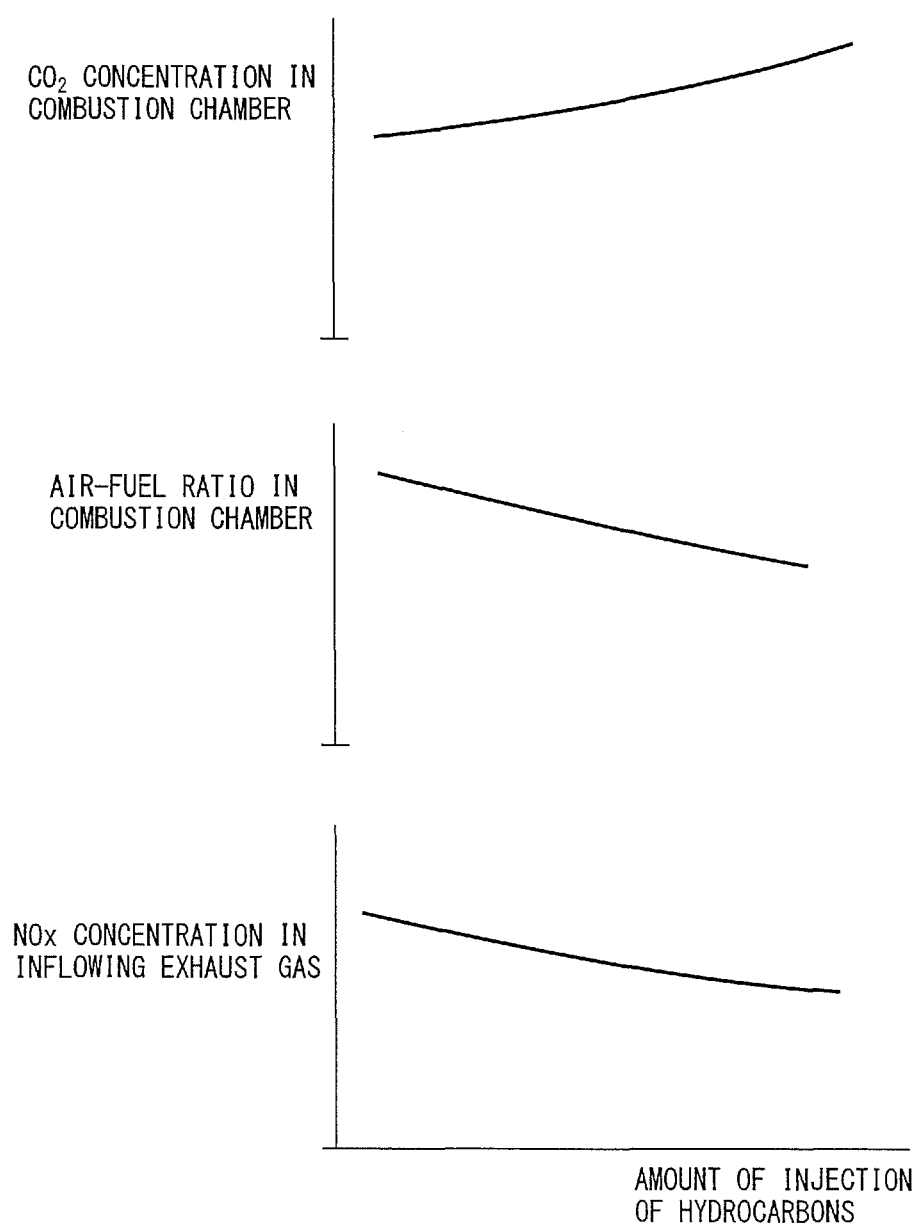
FIG. 18 is a view which shows the concentration of $CO_2$ in the combustion chamber etc.

FIG. 18 shows the relationship of the concentration of $CO_2$ in the combustion chamber 2, the air-fuel ratio in the combustion chamber 2, and the concentration of $NO_x$ in the exhaust gas which flows into the exhaust purification catalyst 13 with the hydrocarbon injection amount in case where hydrocarbons are injected from the hydrocarbon feed valve 15 when an action of recirculation of exhaust gas is being performed by the low pressure exhaust gas recirculation system LPL. As shown in FIG. 18, the concentration of $CO_2$ in the combustion chamber 2 becomes higher the more the hydrocarbon injection amount increases, the air-fuel ratio in the combustion chamber 2 becomes lower the more the hydrocarbon injection amount increases, and the concentration of $NO_x$ in the exhaust gas which flows into the exhaust purification catalyst 13 becomes lower the more the hydrocarbon injection amount increases.

Note that, when the action of recirculation of exhaust gas by the low pressure exhaust gas recirculation system LPL is being performed, if the carbon dioxide $CO_2$ which is generated due to the injection of hydrocarbons is recirculated and reaches the inlet of the exhaust purification catalyst 13, this carbon dioxide $CO_2$ is again recirculated. In this case, the amount of drop in the air-fuel ratio of the exhaust gas which flows into the exhaust purification catalyst 13 becomes largest when the generated carbon dioxide $CO_2$ is recirculated and reaches the inlet of the exhaust purification catalyst 13 the first time, the amount of drop in the air-fuel ratio of the exhaust gas decreases considerably when the carbon dioxide $CO_2$ which reaches the inlet of the exhaust purification catalyst 13 is recirculated and reaches the inlet of the exhaust purification catalyst 13 the second time, and the amount of drop of the air-fuel ratio of the exhaust gas further decreases when the carbon dioxide $CO_2$ is recirculated and reaches the inlet of the exhaust purification catalyst 13 the third time.

Figure 19A:
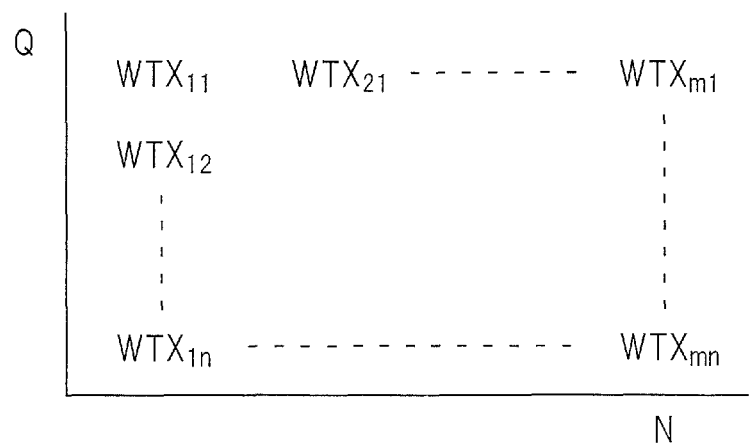
FIGS. 19A and 19B are views which show the injection time of hydrocarbons etc.

In this case, when the amount of drop of the air-fuel ratio of the exhaust gas which flows into the exhaust purification catalyst 13 is the largest, the amount of consumption of the hydrocarbons can be decreased the most. Therefore, in this embodiment according to the present invention, when the temporary drop in the air-fuel ratio of the exhaust gas which flows into the exhaust purification catalyst 13 is first caused after the injection of hydrocarbons, the next action of injection of hydrocarbons from the hydrocarbon feed valve 15 is performed in synchronization with the first temporary drop in the air-fuel ratio. The optimum amount of hydrocarbon injection WTX at this time, that is, when the temporary drop in the air-fuel ratio of the exhaust gas which flows into the exhaust purification catalyst 13 is first caused after injection of hydrocarbons and the next action of injection of hydrocarbons from the hydrocarbon feed valve 15 is performed in synchronization with the first temporary drop in the air-fuel ratio, is stored as a function of the amount of injection Q from the fuel injector 3 and the engine speed N in the form of a map such as shown in FIG. 19A in advance in the ROM 32.

In this regard, as explained above, FIG. 16A shows the optimum hydrocarbon injection amount WT in the normal operating state, that is, the optimum hydrocarbon injection amount WT in the case of injecting hydrocarbons from the hydrocarbon feed valve 15 without particular synchronization with the temporary drop in the air-fuel ratio of the exhaust gas which flows into the exhaust purification catalyst 13 due to injection of hydrocarbons. In this case, only naturally, the hydrocarbon injection amount WTX from the hydrocarbon feed valve 15 which is shown in FIG. 19A is smaller compared with the hydrocarbon injection amount WT from the hydrocarbon feed valve 15 which is shown in FIG. 16A. In this way, when hydrocarbons are injected from the hydrocarbon feed valve 15 in synchronization with the temporary drop in the air-fuel ratio of the inflowing exhaust gas which flows into the exhaust purification catalyst 13, compared with the case where hydrocarbons are injected under the same engine operating conditions but when no temporary drop in the air-fuel ratio of the inflowing exhaust gas occurs, a smaller amount of hydrocarbons is injected from the hydrocarbon feed valve 15.

On the other hand, the time until, after injection of hydrocarbons, the injection of hydrocarbons causes a temporary drop in the air-fuel ratio of the exhaust gas which flows into the exhaust purification catalyst 13 to first occur, that is, the injection period of hydrocarbons from the hydrocarbon feed valve 15, can be calculated from the time which is required for recirculation of the exhaust gas. That is, the time which is required for recirculation of the exhaust gas becomes the sum of the time TA during which EGR gas flowing out from the exhaust purification catalyst 13 and containing carbon dioxide $CO_2$ flows through the inside of the EGR passage 23 of the low pressure exhaust gas recirculation system LPL and the time TB until intake air which contains this EGR gas passes through the intake passages 6a, 6b and combustion chamber 2 and flows into the exhaust purification catalyst 13. In this case, the time TA can be calculated by dividing the volume of the EGR gas circulation passage up to where the exhaust gas which flows out from the exhaust purification catalyst 13, that is, the EGR gas, reaches the intake passage 6a by the amount of EGR, while the time TB can be calculated by dividing the volume of the gas circulation passage up to where the intake air which contains the EGR gas reaches the exhaust purification catalyst 13 by (intake air amount+EGR amount).

Figure 19B:
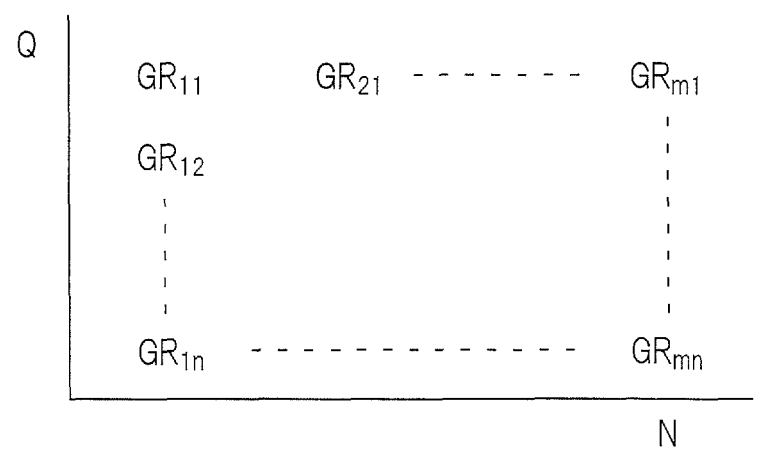

In this regard, in an internal combustion engine, normally, the EGR rate GR (=EGR gas amount/(intake gas amount+ EGR gas amount)) is predetermined in accordance with the operating state of the engine. In one embodiment of the present invention, this EGR rate GR is stored as a function of the amount of injection Q from the fuel injector 3 and the engine speed N in the form of a map such as shown in FIG. 19B in advance in the ROM 32. Therefore, in this embodiment, if the operating state of the engine is determined, the EGR rate GR is determined. On the other hand, in this embodiment, the intake air amount is constantly being measured. Further, the volume of the EGR gas circulation passage and the volume of the gas circulation passage are found in advance. Therefore, in this embodiment, the time (TA+TB) which is required for recirculation of the exhaust gas, that is, the injection period of hydrocarbons from the hydrocarbon feed valve 15, can be calculated from the EGR rate and the amount of intake air. Therefore, in this embodiment, the time (TA+TB) which is required for recirculation of the exhaust gas, that is, the injection period of hydrocarbons from the hydrocarbon feed valve 15, is calculated from the EGR rate and the amount of intake air.

Figure 20A:
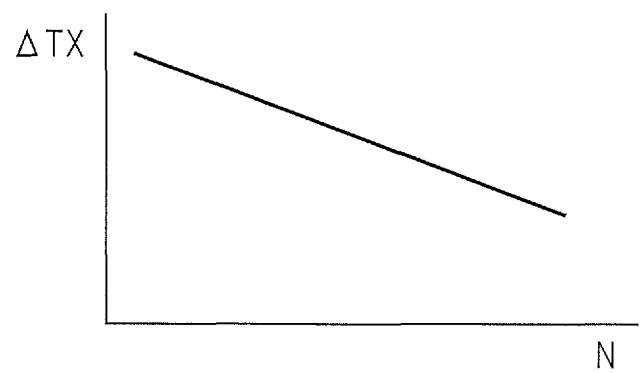
FIG. 20 is a view which shows the injection period of hydrocarbons.
Figure 20B:
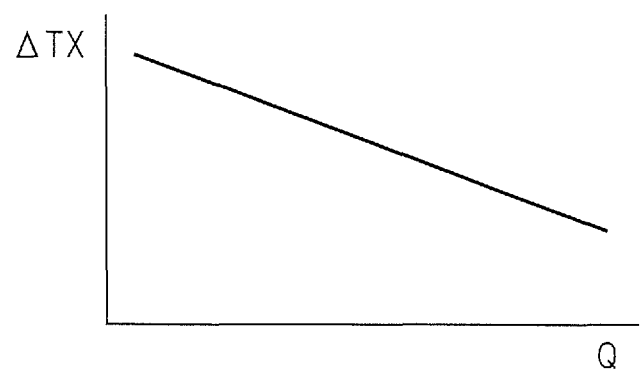

On the other hand, the injection period $\Delta TX$ of hydrocarbons when hydrocarbons are injected from the hydrocarbon feed valve 15 in synchronization with the temporary drop in the air-fuel ratio of the exhaust gas which flows into the exhaust purification catalyst 13 is determined in accordance with the operating state of the engine, if in the steady operating state. That is, the injection period $\Delta TX$ of hydrocarbons, as shown in FIG. 20A, becomes shorter the higher the engine speed N, while the injection period $\Delta TX$ of hydrocarbons, as shown in FIG. 20B, becomes shorter the greater the amount of injection Q from the fuel injector 3. This injection period $\Delta TX$ of hydrocarbons, as shown in FIG. 20C, is stored as a function of the amount of injection Q from the fuel injector 3 and the engine speed N in advance in the ROM 32.

Figure 20C:
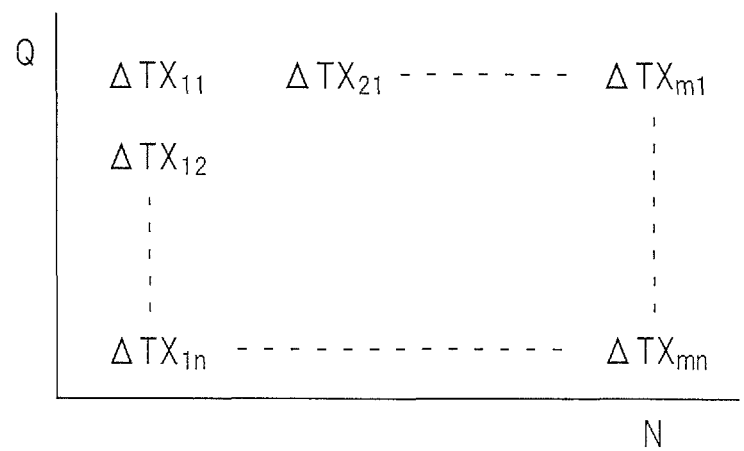

Therefore, in another embodiment according to the present invention, the injection period $\Delta TX$ of hydrocarbons is calculated from the map which is shown in FIG. 20C. At this time, the injection period $\Delta TX$ of hydrocarbons becomes shorter the higher the engine speed N, while the amount of injection Q from the fuel injector 3 becomes shorter the greater the amount of injection Q. That is, at this time, the injection period of hydrocarbons when hydrocarbons are injected from the hydrocarbon feed valve 15 in synchronization with the temporary drop in the air-fuel ratio of the exhaust gas which flows into the exhaust purification catalyst 13 is controlled in accordance with the operating state of the engine so as to become shorter the greater the amount of fuel injection into the combustion chamber 2 and to become shorter the higher the engine speed.

Next, referring to FIG. 21 to FIG. 24, an $NO_X$ purification method when making the exhaust purification catalyst 13 function as an $NO_X$ storage catalyst will be explained specifically. The $NO_X$ purification method in the case of making the exhaust purification catalyst 13 function as an $NO_X$ storage catalyst in this way will be referred to below as the "second $NO_X$ purification method".

Figure 21:
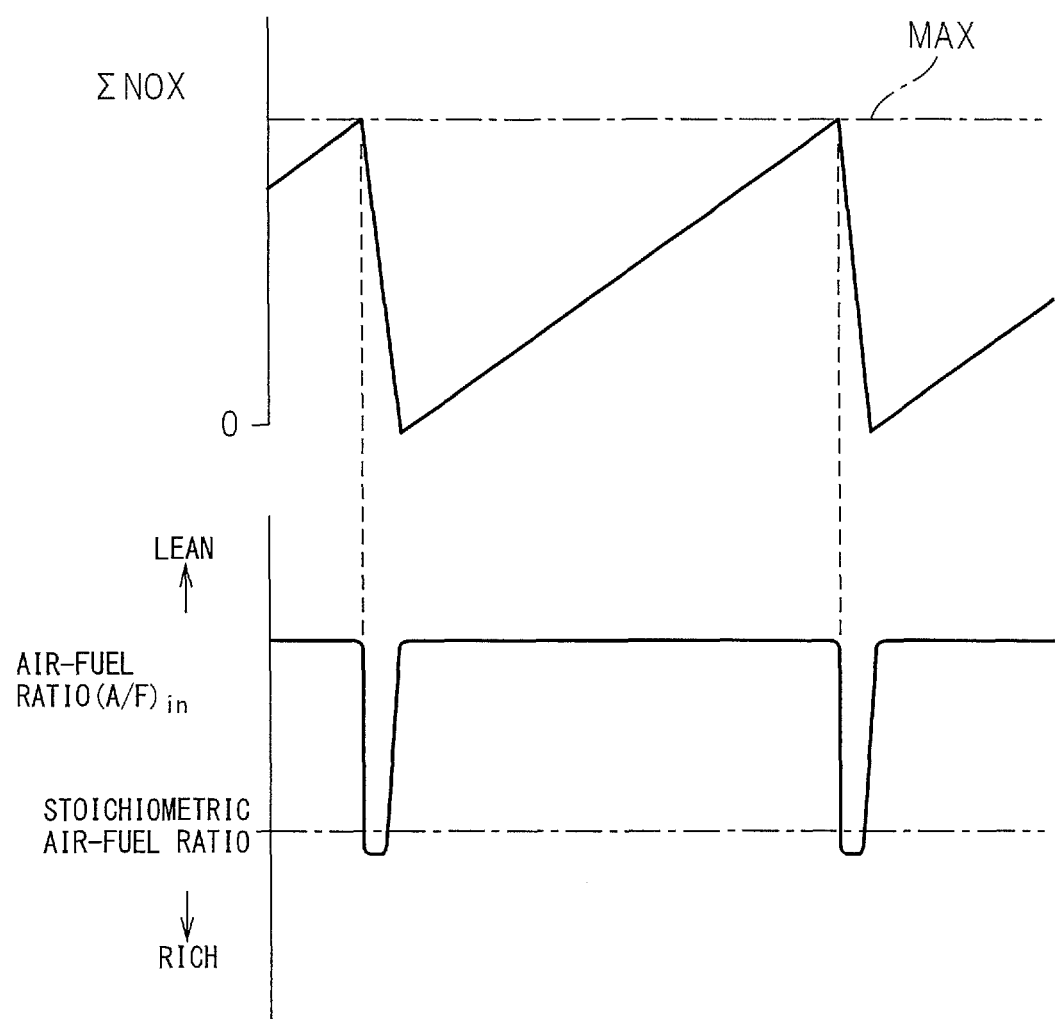
FIG. 21 is a view which shows $NO_X$ release control.

In this second $NO_X$ purification method, as shown in FIG. 21, when the stored $NO_X$ amount $\Sigma NO_X$ of $NO_X$ which is stored in the basic layer 53 exceeds a predetermined allowable amount MAX, the air-fuel ratio (A/F) in of the exhaust gas flowing into the exhaust purification catalyst 13 is temporarily made rich. If the air-fuel ratio (A/F) in of the exhaust gas is made rich, the $NO_X$ which was stored in the basic layer 53 when the air-fuel ratio (A/F) in of the exhaust gas was lean is released from the basic layer 53 all at once and reduced. Due to this, the $NO_X$ is removed.

Figure 22:
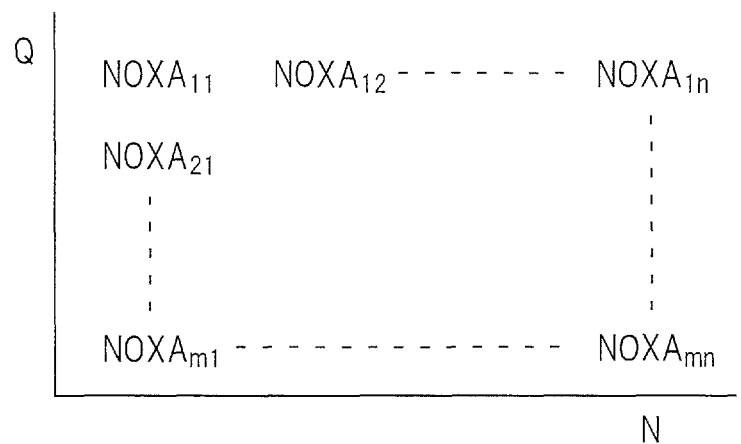
FIG. 22 is a view which shows a map of an exhausted $NO_X$ amount NOXA.

The stored $NO_X$ amount $\Sigma NO_X$ is, for example, calculated from the amount of $NO_X$ which is exhausted from the engine. In this embodiment according to the present invention, the exhausted $NO_X$ amount NOXA of $NO_X$ which is exhausted from the engine per unit time is stored as a function of the injection amount Q and engine speed N in the form of a map such as shown in FIG. 22 in advance in the ROM 32. The stored $NO_X$ amount $\Sigma NO_X$ is calculated from the exhausted $NO_X$ amount NOXA. In this case, as explained before, the period during which the air-fuel ratio (A/F) in of the exhaust gas is made rich is usually 1 minute or more.

Figure 23:
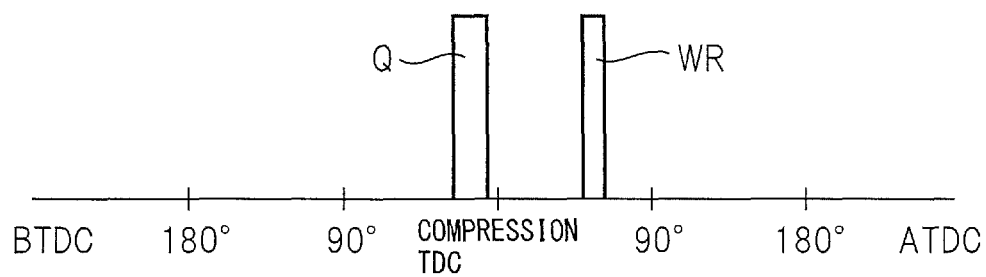
FIG. 23 is a view which shows a fuel injection timing.
Figure 24:
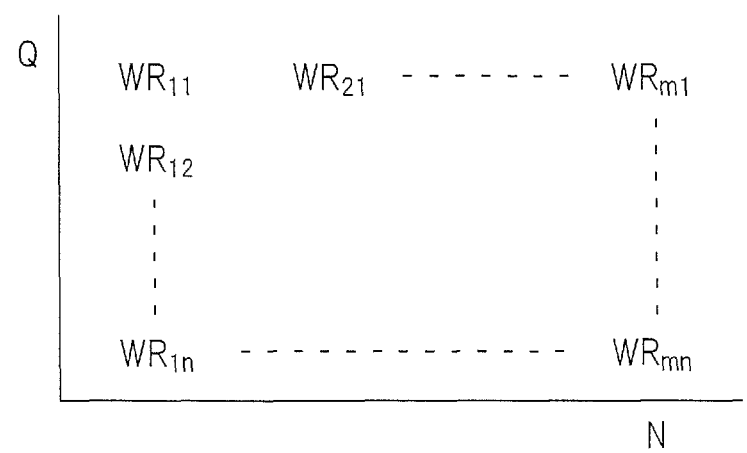
FIG. 24 is a view which shows a map of a hydrocarbon feed amount WR.

In this second $NO_X$ purification method, as shown in FIG. 23, in each combustion chamber 2, the fuel injector 3 injects additional fuel WR in addition to the combustion-use fuel Q so that the air-fuel ratio (A/F) in of the exhaust gas which flows into the exhaust purification catalyst 13 is made rich. Note that, in FIG. 23, the abscissa indicates the crank angle. This additional fuel WR is injected at a timing at which it will burn, but will not appear as engine output, that is, slightly before ATDC90° after compression top dead center. This fuel amount WR is stored as a function of the injection amount Q and engine speed N in the form of a map such as shown in FIG. 24 in advance in the ROM 32. Of course, in this case, it is also possible to make the injection amount of hydrocarbons from the hydrocarbon feed valve 15 increase so as to make the air-fuel ratio (A/F) in of the exhaust gas rich.

Now, the temperature of the exhaust gas which flows out from the exhaust purification catalyst 13 and the particulate filter 14 to the inside of the exhaust pipe 12b is considerably lower than the temperature of the exhaust gas which is exhausted to the inside of the exhaust manifold 5, therefore, the temperature of the exhaust gas which is recirculated by the low pressure exhaust gas recirculation system LPL to the inside of the combustion chambers 2 becomes considerably lower than the temperature of the exhaust gas which is recirculated by the high pressure exhaust gas recirculation system HPL to the inside of the combustion chambers 2. Therefore, use of the low pressure exhaust gas recirculation system LPL to recirculate exhaust gas, compared with use of the high pressure exhaust gas recirculation system HPL to recirculate exhaust gas, results in the combustion temperature in the combustion chambers 2 falling and the amount of production of $NO_X$ in the combustion chambers 2 falling. That is, using the low pressure exhaust gas recirculation system LPL to recirculate the exhaust gas, compared with using the high pressure exhaust gas recirculation system HPL to recirculate the exhaust gas, enables a reduction of the amount of $NO_X$ which is exhausted from the combustion chambers 2.

Therefore, in this embodiment according to the present invention, usually the low pressure exhaust gas recirculation system LPL is used for the recirculation action of exhaust gas. Only when use of the high pressure exhaust gas recirculation system HPL would be preferable over use of the low pressure exhaust gas recirculation system LPL is the high pressure exhaust gas recirculation system HPL used.

On the other hand, if comparing the $NO_X$ purification rate when using the first $NO_X$ purification method and the $NO_X$ purification rate when using the second $NO_X$ purification method, using the first $NO_X$ purification method enables a higher $NO_X$ purification rate to be obtained. On the other hand, the frequency of feed of hydrocarbons in the case of use of the first $NO_X$ purification method is considerably higher than the frequency of feed of hydrocarbons in the case of use of the second $NO_X$ purification method, so the amount of hydrocarbons which are consumed for removal of $NO_X$ becomes greater in the case of use of the first $NO_X$ purification method compared with the case of use of the second $NO_X$ purification method. That is, if viewed from the $NO_X$ purification rate, use of the first $NO_X$ purification method is preferable, but if viewed from the standpoint of the reduction of the amount of consumption of hydrocarbons, it can be said that use of the second $NO_X$ purification method is preferable.

Figure 25:
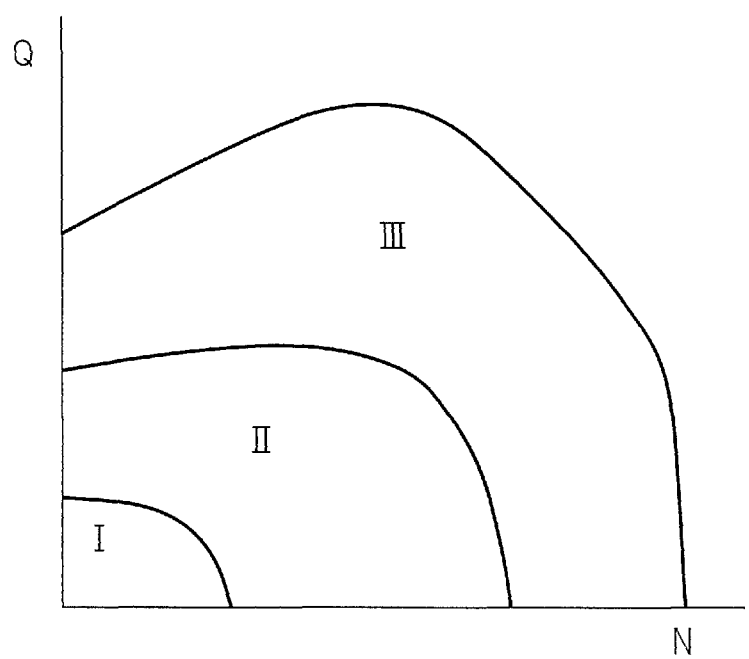
FIG. 25 is a view which shows operating regions I, II, and III.

If considering these facts, whether the low pressure exhaust gas recirculation system LPL is used or the high pressure exhaust gas recirculation system HPL is used determines whether the first $NO_X$ purification method is used or the second $NO_X$ purification method is used. In this embodiment according to the present invention, as shown in FIG. 25, the operating region of the engine is divided into three operating regions I, II, and III according to the fuel injection amount Q from the fuel injectors 3 and the engine speed N. At the time of steady operation, which of the low pressure exhaust gas recirculation system LPL and the high pressure exhaust gas recirculation system HPL is used and which of the first $NO_X$ purification method and the second $NO_X$ purification method is used are determined in advance for the operating regions I, II, and III.

In FIG. 25, the operating region II expresses the medium speed, medium load operating region which is used frequently at the time of steady operation. At the time of steady operation, in this operating region II, as the exhaust gas recirculation system, the low pressure exhaust gas recirculation system LPL is used, while as the $NO_X$ purification method, the second $NO_X$ purification method is used. That is, in the operating region II, the low pressure exhaust gas recirculation system LPL is used so as to reduce the amount of exhaust of $NO_X$ from the combustion chambers 2 and the second $NO_X$ purification method is used so as to reduce the amount of consumption of hydrocarbons.

On the other hand, in FIG. 25, the operating region III expresses the high speed, high load operating region. At the time of steady operation, in this operating region III, as the exhaust gas recirculation system, the low pressure exhaust gas recirculation system LPL is used, while as the $NO_X$ purification method, the first $NO_X$ purification method is used. That is, at the time of high speed, high load operation, the amount of exhaust of $NO_X$ from the combustion chambers 2 increases. Therefore, at this time, the low pressure exhaust gas recirculation system LPL is used so as to reduce the amount of exhaust of $NO_X$ from the combustion chambers 2 as much as possible and the first $NO_X$ purification method is used so as to obtain a high $NO_X$ purification rate.

On the other hand, in FIG. 25, the operating region I expresses the low speed, low load operating region. In this operating region I, as the exhaust gas recirculation system, the high pressure exhaust gas recirculation system HPL is used, while as the $NO_X$ purification method, the second $NO_X$ purification method is used. That is, at the time of low speed, low load operation, the temperature of the exhaust gas which is exhausted from the combustion chambers 2 is low. If at this time using the low pressure exhaust gas recirculation system LPL to recirculate the exhaust gas, the moisture which is contained in the exhaust gas will condense inside of the cooling device 23a. As a result, the problem will arise of moisture ending up building up inside of the low pressure exhaust gas recirculation system LPL. To prevent such a problem from occurring, in the operating region I, the high pressure exhaust gas recirculation system HPL is used, while the second $NO_X$ purification method is used to reduce the amount of consumption of hydrocarbons.

In this way, in the embodiment which is shown in FIG. 25, in the operating region II and III, the low pressure exhaust gas recirculation system LPL is used. Only in the operating region I is the high pressure exhaust gas recirculation system HPL used. On the other hand, in the operating regions I and II, the second $NO_X$ purification method is used, while in the operating region III, the first $NO_X$ purification method is used. Accordingly, if the Operating state of the engine changes from the operating region I or II to the operating region III, the $NO_X$ purification action is switched from the $NO_X$ purification action by the second $NO_X$ purification method to the $NO_X$ purification action by the first $NO_X$ purification method.

Figure 26:
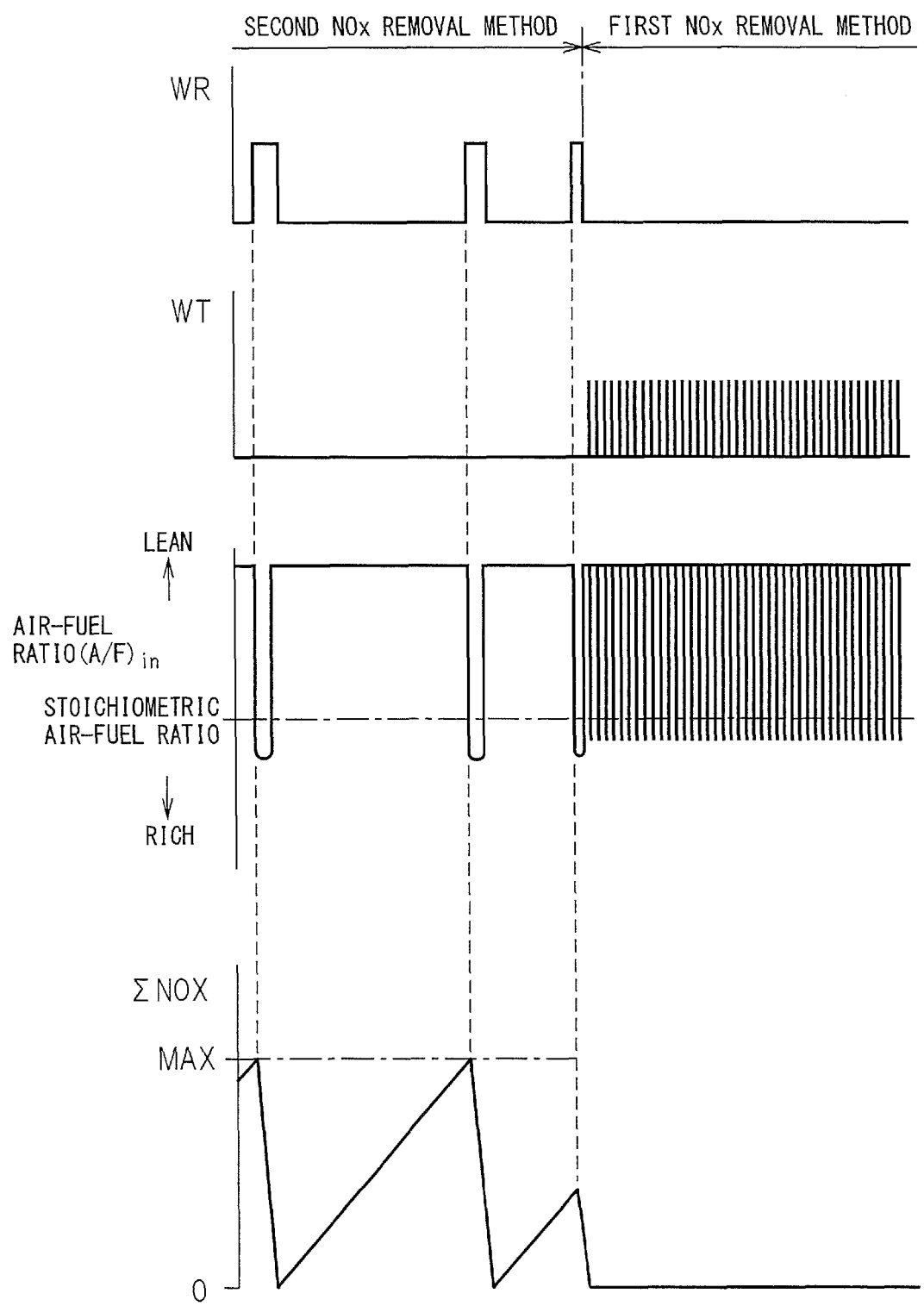
FIG. 26 is a view which shows a first $NO_X$ purification method and a second $NO_X$ purification method.

FIG. 26 shows the changes in the injection timing of additional fuel WR, the feed timing of hydrocarbons WT, the air-fuel ratio (A/F) in of the exhaust gas which flows into the exhaust purification catalyst 13, and the stored $NO_X$ amount ΣNOX which is stored in the exhaust purification catalyst 13 when the $NO_X$ purification action by the second $NO_X$ purification method is switched to the $NO_X$ purification action by the first $NO_X$ purification method. If, in the state where the exhaust purification catalyst 13 stores $NO_X$, the $NO_X$ purification action by the second $NO_X$ purification method is switched to the $NO_X$ purification action by the first $NO_X$ purification method, when the $NO_X$ purification action by the first $NO_X$ purification method is started, the $NO_X$ which is stored in the exhaust purification catalyst 13 is released without being reduced. Therefore, in this embodiment according to the present invention, when the $NO_X$ purification action by the second $NO_X$ purification method is switched to the $NO_X$ purification action by the first $NO_X$ purification method, if the exhaust purification catalyst 13 stores $NO_X$, as shown in FIG. 26, additional fuel WR is fed and the air-fuel ratio (A/F) in of the exhaust gas which flows in the exhaust purification catalyst 13 is temporarily made rich to release and reduce the stored $NO_X$.

Figure 27:
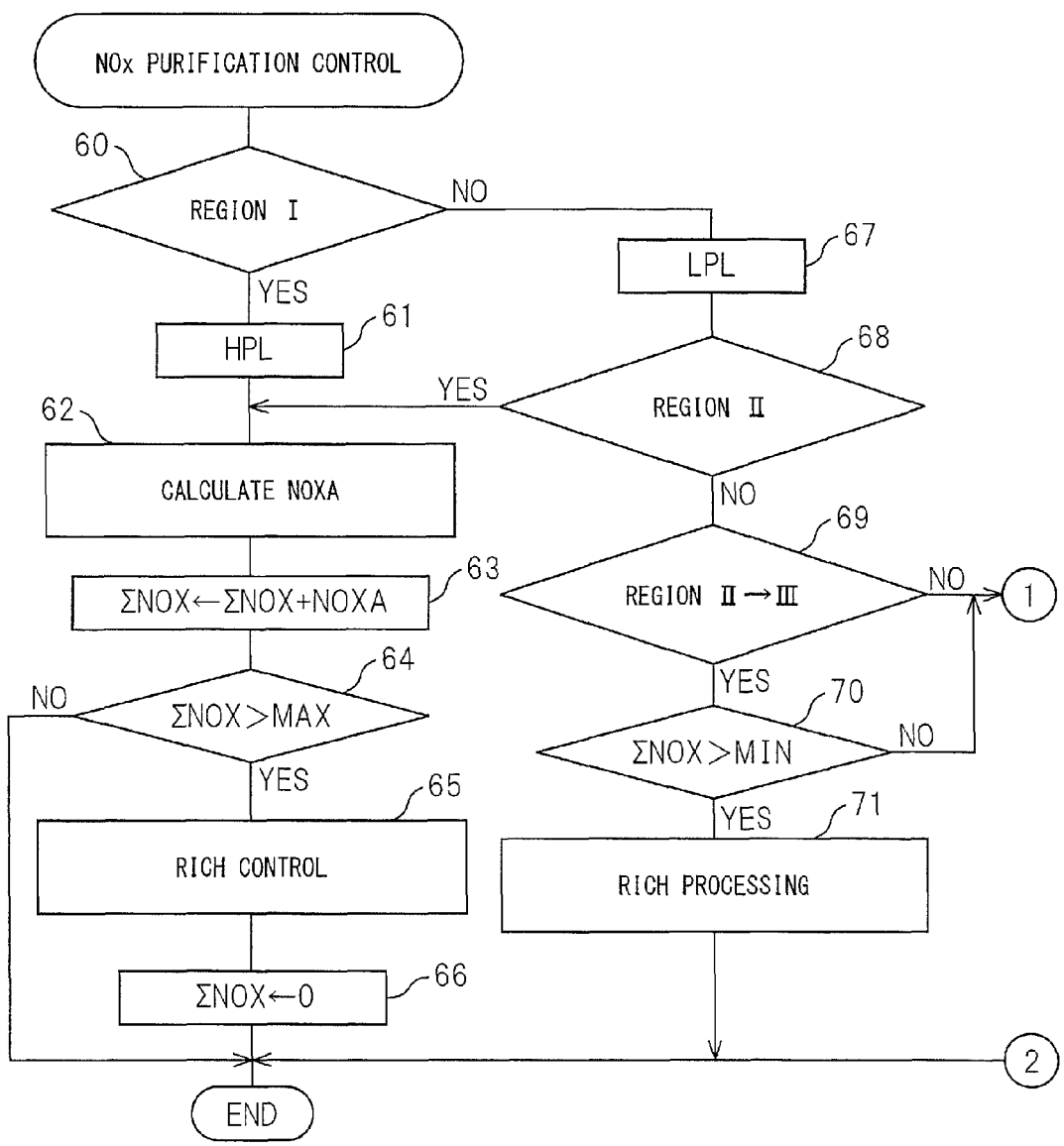
FIG. 27 is a flow chart for $NO_X$ purification control.
Figure 28:
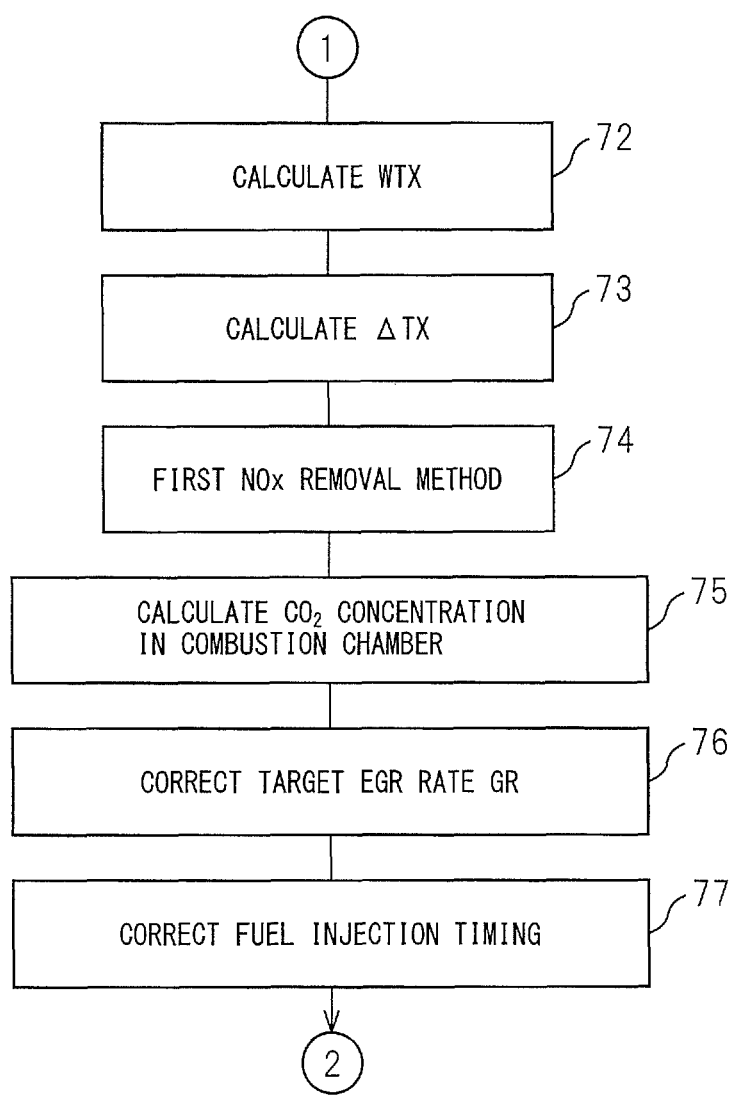
FIG. 28 is a flow chart for $NO_X$ purification control.

FIG. 27 and FIG. 28 show an $NO_X$ purification control routine. This routine is executed by interruption every certain time period.

Referring to FIG. 27, first, to start, at step 60, it is judged if the operating state of the engine is in the operating region I which is shown in FIG. 25. When the operating state of the engine is in the operating region I, the routine proceeds to step 61 where the exhaust gas recirculation action by the high pressure exhaust gas recirculation system HPL is performed. Next, the routine proceeds to step 62 where the $NO_x$ removal action by the second $NO_x$ removal method is performed.

That is, at step 62, the $NO_x$ amount NOXA which is exhausted per unit time is calculated from the map which is shown in FIG. 22. Next, at step 63, the exhausted $NO_x$ amount NOXA is added to ΣNOX to calculate the stored $NO_x$ amount ΣNOX. Next, at step 64, it is judged if the stored $NO_x$ amount ΣNOX exceeds the allowable value MAX. If ΣNOX>MAX, the routine proceeds to step 65 where the amount of additional fuel WR is calculated from the map which is shown in FIG. 24 and the action of injection of additional fuel is performed. Next, at step 66, ΣNOX is cleared.

On the other hand, when, at step 60, the operating state of the engine is not in the operating region I, the routine proceeds to step 67 where the exhaust gas recirculation action by the low pressure exhaust gas recirculation system LPL is performed. Next, at step 68, it is judged if the operating state of the engine is in the operating region II which is shown in FIG. 25. When the operating state of the engine is in the operating region II, the routine proceeds to step 62 where the $NO_x$ removal action by the second $NO_x$ removal method is performed. As opposed to this, when the operating state of the engine is not in the operating region II, that is, when the operating state of the engine is in the operating region III which is shown in FIG. 25, the routine proceeds to step 69 where it is judged if the operating state of the engine has now changed from the operating region II to the operating region III. When the operating state of the engine has not now changed from the operating region II to the operating region III, that is, when the operating state of the engine continues to be in the operating region III, the routine proceeds to step 72 where the $NO_x$ removal action by the first $NO_x$ removal method is performed. At this time, control for injection of hydrocarbons from the hydrocarbon feed valve 15 according to the present invention which is shown in FIG. 17 is performed.

On the other hand, when it is judged at step 69 that the operating state of the engine has now changed from the operating region II to the operating region III, the routine proceeds to step 70 where it is judged if the stored $NO_x$ amount ΣNOX is larger than a constant value MIN. Note that, this constant value MIN is made a value considerable smaller than the allowable value MAX. When it is judged at step 70 that the stored $NO_x$ amount ΣNOX is smaller than the constant value MIN, the routine proceeds to step 72. As opposed to this, when it is judged that the stored $NO_x$ amount ΣNOX is larger than the constant value MIN, the routine proceeds to step 71 where, to make the stored $NO_x$ be released and reduced, as shown in FIG. 26, additional fuel WR is fed to make the air-fuel ratio (A/F) in of the exhaust gas which flows into the exhaust purification catalyst 13 temporarily rich, then ΣNOX is cleared. Next the processing cycle is ended.

At step 72, the hydrocarbon injection amount WTX when hydrocarbons are injected from the hydrocarbon feed valve 15 in synchronization with the temporary drop in the air-fuel ratio of the exhaust gas which flows into the exhaust purification catalyst 13 is calculated from the map which is shown in FIG. 19A. Next, at step 73, the injection period ΔTX of hydrocarbons at this time is calculated from the EGR rate GR which is shown in FIG. 19B and the intake air amount or from the map which is shown in FIG. 20C. Next, at step 74, under the $NO_x$ removal action by the first $NO_x$ removal method, the injection amount WTX of hydrocarbons is injected by the injection period ΔTX from the hydrocarbon feed valve 15. At this time, the action of injection of hydrocarbons from the hydrocarbon feed valve 15 is performed in synchronization with the temporary drop in the air-fuel ratio of the exhaust gas which flows into the exhaust purification catalyst 13.

On the other hand, at this time, carbon dioxide generated at the exhaust purification catalyst 13 is sent into the combustion chamber 2. In this regard, if carbon dioxide is sent into the combustion chamber 2 in this way, the inert ingredients in the combustion chamber 2 will increase and, as a result, the combustion ends up deteriorating. Therefore, in this embodiment, at the following steps 75 to 77, to prevent the combustion from deteriorating at this time, the target EGR rate GR is made to fall or the fuel injection timing from the fuel injector 3 is advanced. That is, at step 75, the concentration of carbon dioxide which is fed into the combustion chamber 2 at this time is calculated. Next, at step 76, this calculated concentration of carbon dioxide is used as the basis for correction of the target EGR rate GR in a falling direction. Next, at step 77, this calculated concentration of carbon dioxide is used as the basis for correction of the fuel injection timing from the fuel injector 3 in an advancing direction.

Now then, when the base air-fuel ratio is low, it is possible to easily make the air-fuel ratio rich by injecting hydrocarbons from the hydrocarbon feed valve 15. Therefore, when the base air-fuel ratio is low, the $NO_x$ removal action by the first $NO_x$ removal method can be easily performed. As opposed to this, when the base air-fuel ratio becomes high, even if increasing the amount of injection of hydrocarbons from the hydrocarbon feed valve 15, it becomes hard for the air-fuel ratio to become rich. Therefore, if the base air-fuel ratio becomes high, sometimes performing the $NO_x$ removal action by the first $NO_x$ removal method becomes difficult. However, if hydrocarbons are injected from the hydrocarbon feed valve 15 in synchronization with the temporary drop in the air-fuel ratio of the exhaust gas which flows into the exhaust purification catalyst 13, even if the original base air-fuel ratio is high, the air-fuel ratio can easily be made rich. Therefore, even when the base air-fuel ratio is high, the $NO_x$ removal action by the first $NO_x$ removal method can be easily performed.

Figure 29:
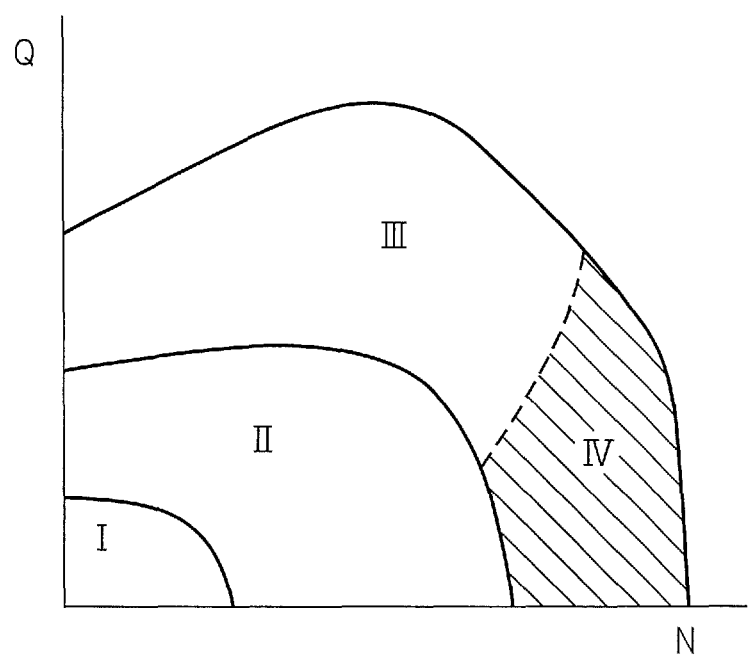
FIG. 29 is a view which shows operating region IV.

In this regard, in an ordinary internal combustion engine, the base air-fuel ratio becomes highest in the engine high speed low load operating region. The operating regions I, II, and III of FIG. 29 express operating regions the same as the operating regions I, II, and III which are shown in FIG. 25. The engine high speed low load operating region where the base air-fuel ratio becomes the highest is shown in FIG. 29 by the operating region IV. Therefore, in another embodiment according to the present invention, the action of injection of hydrocarbons from the hydrocarbon feed valve 15 in synchronization with the temporary drop in the air-fuel ratio of the exhaust gas which flows in is made to be performed in the engine high speed low load operating region IV where the base air-fuel ratio becomes the highest.

Figure 30:
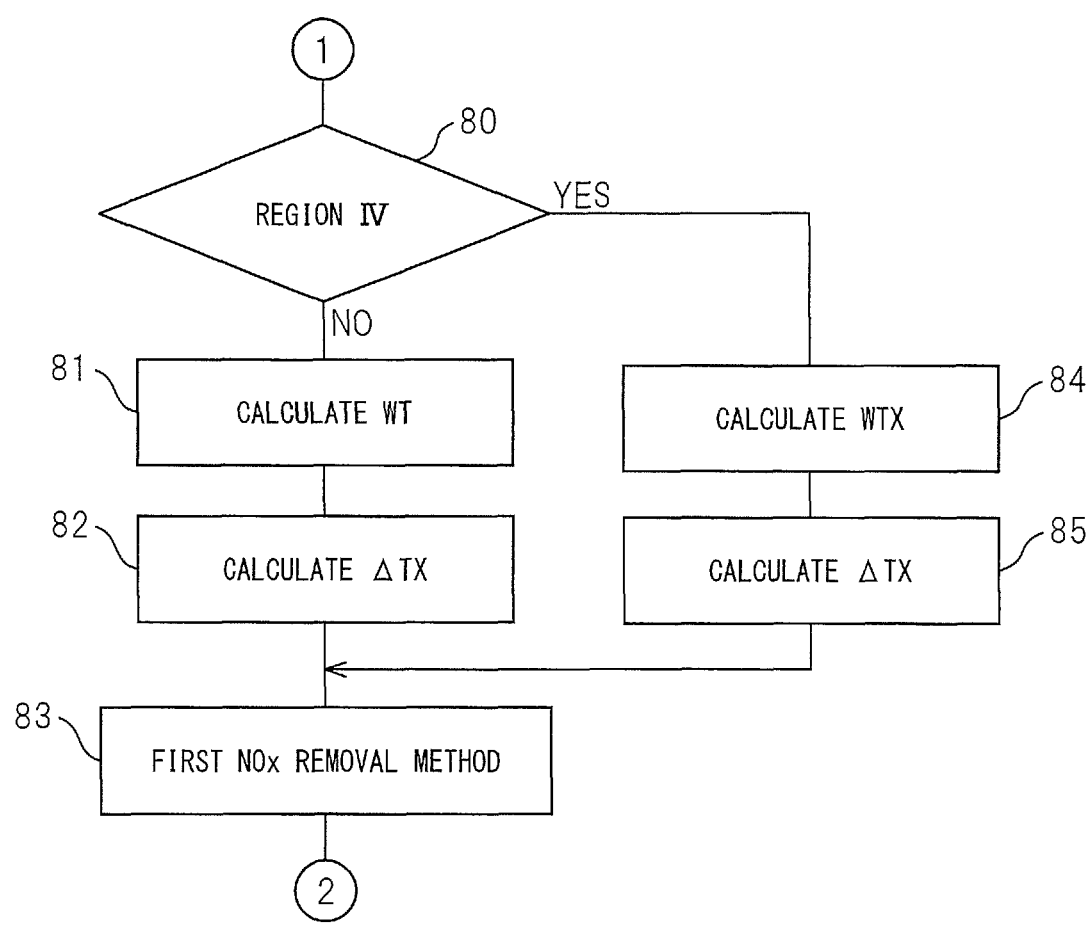
FIG. 30 is a flow chart for $NO_X$ purification control.

To work this embodiment, instead of the flow chart which is shown in FIG. 28, the flow chart which is shown in FIG. 30 is used.

Referring to FIG. 30, first, to start, at step 80, it is judged if the operating state of the engine is in the operating region IV. When the operating state of the engine is in the operating region IV, the routine proceeds to step 84 where the hydrocarbon injection amount WTX when hydrocarbons are injected from the hydrocarbon feed valve 15 in synchronization with the temporary drop in the air-fuel ratio of the exhaust gas which flows into the exhaust purification catalyst 13 is calculated from the map which is shown in FIG. 19A. Next, at step 85, the injection period ΔTX of hydrocarbons at this time is calculated from the EGR rate GR which is shown in FIG. 19B and the intake air amount or from the map which is shown in FIG. 20C. Next, at step 83, under the $NO_X$ removal action by the first $NO_X$ removal method, the injection amount WTX of hydrocarbons is injected by the injection period ΔTX from the hydrocarbon feed valve 15. At this time, the action of injection of hydrocarbons from the hydrocarbon feed valve 15 is performed in synchronization with the temporary drop in the air-fuel ratio of the exhaust gas which flows into the exhaust purification catalyst 13.

On the other hand, when it is judged at step 80 that the operating state of the engine is not in the operating region IV, the routine proceeds to step 81 where the optimum injection WT of hydrocarbons in the normal operating state is calculated from the map which is shown in FIG. 16A. Next, at step 82, the optimum period ΔT of hydrocarbons in the normal operating state is calculated from the map which is shown in FIG. 16B. Next, at step 83, under the $NO_X$ removal action by the first $NO_X$ removal method, the injection amount WT of hydrocarbons is injected by the injection period ΔT from the hydrocarbon feed valve 15. At this time, the action of injection of hydrocarbons from the hydrocarbon feed valve 15 is performed without being synchronized with the temporary drop in the air-fuel ratio of the exhaust gas which flows into the exhaust purification catalyst 13.

On the other hand, exhaust gas contains $SO_x$. This $SO_x$ is stored a little at a time in the exhaust purification catalyst 13. That is, the exhaust purification catalyst 13 suffers from $SO_x$ poisoning. In this case, the $SO_x$ which is stored in the exhaust purification catalyst 13 can be made to be released from the exhaust purification catalyst 13 by making the temperature of the exhaust purification catalyst 13 rise to 600° C. or so and making the air-fuel ratio of the exhaust gas which flows into the exhaust purification catalyst 13 rich. In this case as well, when the base air-fuel ratio is low, it is possible to easily make the air-fuel ratio rich by injecting hydrocarbons from the hydrocarbon feed valve 15. Therefore, when the base air-fuel ratio is low, the action of release of $SO_x$ from the exhaust purification catalyst 13 can be easily performed. As opposed to this, if the base air-fuel ratio becomes high, even if increasing the amount of injection of hydrocarbons from the hydrocarbon feed valve 15, it becomes difficult for the air-fuel ratio to become rich. Therefore, if the base air-fuel ratio becomes high, sometimes the action of release of $SO_x$ from the exhaust purification catalyst 13 becomes difficult.

However, in this case as well, if hydrocarbons are injected from the hydrocarbon feed valve 15 in synchronization with the temporary drop in the air-fuel ratio of the exhaust gas which flows into the exhaust purification catalyst 13, even in the case where the original base air-fuel ratio is high, it is possible to easily make the air-fuel ratio rich. Therefore, even when the base air-fuel ratio is high, it is possible to easily perform the action of release of $SO_x$ from the exhaust purification catalyst 13. Therefore, in still another embodiment according to the present invention, hydrocarbons are injected from the hydrocarbon feed valve 15 in synchronization with the temporary drop in the air-fuel ratio of the exhaust gas which flows into the exhaust purification catalyst 13 so as to perform the action of release of $SO_X$ from the exhaust purification catalyst 13 in the engine high speed low load operating region IV where the base air-fuel ratio becomes the highest (FIG. 29). That is, in this embodiment, when $SO_x$ should be released from the exhaust purification catalyst 13, the action of injection of hydrocarbons from the hydrocarbon feed valve 15 is performed in synchronization with the temporary drop in the air-fuel ratio of the inflowing exhaust gas in the engine high speed low load operating region IV where the base air-fuel ratio becomes the highest.

FIG. 31 shows an $SO_x$ release control routine. This routine is executed by interruption every constant time period.

Referring to FIG. 31, first, to start, at step 90, it is judged if an $SO_x$ release command is issued which commands the exhaust purification catalyst 13 release $SO_x$. When the $SO_x$ release command is not issued, the processing cycle is ended. As opposed to this, when the $SO_x$ release command is issued, the routine proceeds to step 91 where the $NO_x$ removal action by the first $NO_x$ removal method and the $NO_x$ removal action by the second $NO_x$ removal method are suspended. Next, at step 92, it is judged if the temperature elevation control which makes the temperature of the exhaust purification catalyst 13 rise to 600° C. or so has been completed. When the temperature elevation control of the exhaust purification catalyst 13 has not been completed, the routine proceeds to step 93 where the temperature elevation control of the exhaust purification catalyst 13 is performed. This temperature elevation control is performed by intermittently injecting hydrocarbons from the hydrocarbon feed valve 15. As opposed to this, when the temperature elevation control of the exhaust purification catalyst 13 has been completed, the routine proceeds to step 94.

At step 94, it is judged if the operating state of the engine is in the operating region I which is shown in FIG. 29. When the operating state of the engine is in the operating region I, the routine proceeds to step 95 where the exhaust gas recirculation action by the high pressure exhaust gas recirculation system HPL is performed. Next the routine proceeds to step 98. On the other hand, when it is judged at step 94 that the operating state of the engine is not in the operating region I, the routine proceeds to step 96 where the exhaust gas recirculation action by the low pressure exhaust gas recirculation system LPL is performed. Next at step 97, it is judged if the operating state of the engine is in the operating region IV which is shown in FIG. 29. When the operating state of the engine is not in the operating region IV, the routine proceeds to step 98.

At step 98, the injection WTs of hydrocarbons which is optimum for making the exhaust purification catalyst 13 release $SO_x$ in the normal operating state is calculated from the map such as shown in FIG. 16A which is stored in advance. Next at step 99, the injection period ΔTs of hydrocarbons which is optimum for making the exhaust purification catalyst 13 release $SO_x$ in the normal operating state is calculated from the map such as shown in FIG. 16B which is stored in advance. Next at step 100, the injection amount WTs of hydrocarbons is injected by the injection period ΔTs from the hydrocarbon feed valve 15. At this time, the action of injection of hydrocarbons from the hydrocarbon feed valve 15 is performed without synchronization with the temporary drop in the air-fuel ratio of the exhaust gas which flows into the exhaust purification catalyst 13.

On the other hand, when it is judged at step 97 that the operating state of the engine is the operating region IV which is shown in FIG. 29, the routine proceeds to step 101 where the hydrocarbon injection amount WTXs when hydrocarbons are injected from the hydrocarbon feed valve 15 in synchronization with the temporary drop in the air-fuel ratio of the exhaust gas which flows into the exhaust purification catalyst 13 is calculated from the map such as shown in FIG. 19A which is stored in advance. Next at step 102, the injection period ΔTX of hydrocarbons at this time is calculated from the map such as shown in FIG. 20C which is stored in advance. Next, at step 100, the injection amount WTXs of hydrocarbons is injected by the injection period ΔTXs from the hydrocarbon feed valve 15. At this time, the action of injection of hydrocarbons from the hydrocarbon feed valve 15 is performed in synchronization with the temporary drop in the air-fuel ratio of the exhaust gas which flows into the exhaust purification catalyst 13.

Note that, as another embodiment, it is also possible to arrange an oxidation catalyst for reforming the hydrocarbons in the engine exhaust passage upstream of the exhaust purification catalyst 13.

REFERENCE SIGNS LIST 4 intake Manifold
5 exhaust manifold
7 exhaust turbocharger
12a, 12b exhaust pipe
13 exhaust purification catalyst
14 particulate filter
15 hydrocarbon feed valve
HPL high pressure exhaust gas recirculation system
LPL low pressure exhaust gas recirculation system

The invention claimed is:

1. An exhaust purification system of an internal combustion engine, the exhaust purification system comprising:
an exhaust purification catalyst arranged in an engine exhaust passage;
a hydrocarbon feed valve arranged in the engine exhaust passage upstream of the exhaust purification catalyst;
a precious metal catalyst that is carried on an exhaust gas flow surface of the exhaust purification catalyst, a basic exhaust gas flow surface part being formed around the precious metal catalyst; and
an electronic control unit configured to control the hydrocarbon feed valve such that a concentration of hydrocarbons flowing into the exhaust purification catalyst vibrate within a predetermined range of amplitude and within a predetermined period of time in order to remove NO$_x$ contained in the exhaust gas, wherein
when exhaust gas downstream of the exhaust purification catalyst in the engine exhaust passage recirculates to an inside of an intake passage and a temporary drop in an air-fuel ratio of an inflowing exhaust gas which flows into the exhaust purification catalyst occurs, the electronic control unit is configured to cause the hydrocarbon feed valve to inject the hydrocarbons in synchronization with the temporary drop in the air-fuel ratio of the inflowing exhaust gas.

2. The exhaust purification system of an internal combustion engine as claimed in claim 1, wherein when the temporary drop in the air-fuel ratio of the exhaust gas which flows into the exhaust purification catalyst occurs after injection of hydrocarbons, the electronic control unit is configured to cause the hydrocarbon feed valve to perform a next action of injection of hydrocarbons in synchronization with the first temporary drop in the air-fuel ratio.

3. The exhaust purification system of an internal combustion engine as claimed in claim 2, wherein when the temporary drop occurs in the air-fuel ratio of the inflowing exhaust gas occurs, the electronic control unit is configured to cause the hydrocarbon feed valve to inject a smaller amount of hydrocarbons than when the temporary drop in the air-fuel ratio of the inflowing exhaust gas does not occur.

4. The exhaust purification system of an internal combustion engine as claimed in claim 1, wherein the electronic control unit is configured to control the hydrocarbon feed valve such that, when the hydrocarbons are injected in synchronization with the temporary drop in the air-fuel ratio of the inflowing exhaust gas, an injection period during which the hydrocarbon feed valve is configured to inject the hydrocarbons is shorter when an amount of fuel injected into the combustion chamber is greater or when an engine speed is higher.

5. The exhaust purification system of an internal combustion engine as claimed in claim 1, wherein the electronic control unit is configured to calculate an injection timing during which the hydrocarbon feed valve is controlled to inject the hydrocarbons in synchronization with the temporary drop in the air-fuel ratio of the inflowing exhaust as based upon a recirculation rate of the exhaust gas and an intake air amount.

6. The exhaust purification system of an internal combustion engine as claimed in claim 1, wherein in an engine high speed low load operating region where a base air-fuel ratio becomes high, the electronic control unit is configured to control the hydrocarbon feed valve to inject the hydrocarbons in synchronization with the temporary drop in the air-fuel ratio of the inflowing exhaust gas.

7. The exhaust purification system of an internal combustion engine as claimed in claim 1, wherein when SO$_x$ is released from the exhaust purification catalyst, in an engine high speed low load operating region where a base air-fuel ratio becomes high, the electronic control unit is configured to control the hydrocarbon feed valve to inject the hydrocarbons in synchronization with the temporary drop in the air-fuel ratio of the inflowing exhaust gas.

8. The exhaust purification system of an internal combustion engine as claimed in claim 1, wherein when the electronic control unit controls the hydrocarbon feed valve to inject the hydrocarbons in synchronization with the temporary drop in the air-fuel ratio of the inflowing exhaust gas, a recirculation rate of the exhaust gas is falls, or a fuel injection timing to the combustion chamber is advanced.

* * * * *